(12) United States Patent
Mioduszewski et al.

(10) Patent No.: US 12,019,001 B2
(45) Date of Patent: Jun. 25, 2024

(54) FLUID TRANSPORT SYSTEM

(71) Applicant: LEICA BIOSYSTEMS MELBOURNE PTY LTD, Mount Waverley (AU)

(72) Inventors: Zbigniew Mioduszewski, Ringwood North (AU); Aaron Ridgway, Aspendale (AU); Matthew King, Burwood (AU); Blake Hellard, Glen Waverley (AU)

(73) Assignee: LEICA BIOSYSTEMS MELBOURNE PTY LTD, Mount Waverley (AU)

( * ) Notice: Subject to any disclaimer, the term of this patent is extended or adjusted under 35 U.S.C. 154(b) by 0 days.

(21) Appl. No.: 17/959,109

(22) Filed: Oct. 3, 2022

(65) Prior Publication Data
US 2023/0022299 A1     Jan. 26, 2023

Related U.S. Application Data

(63) Continuation of application No. 16/620,276, filed as application No. PCT/AU2018/051358 on Dec. 19, 2018, now Pat. No. 11,493,411.

(30) Foreign Application Priority Data

Dec. 21, 2017 (AU) ................................ 2017905115

(51) Int. Cl.
*G01N 1/00* (2006.01)
*G01N 1/31* (2006.01)
(Continued)

(52) U.S. Cl.
CPC ....... *G01N 1/312* (2013.01); *G01N 35/00029* (2013.01); *G01N 35/1002* (2013.01);
(Continued)

(58) Field of Classification Search
None
See application file for complete search history.

(56) References Cited

U.S. PATENT DOCUMENTS 6,045,759 A    4/2000   Ford et al.
8,883,509 B2 *   11/2014   Lemme .................. G01N 1/312
                                                            422/563

(Continued)

FOREIGN PATENT DOCUMENTS

JP     2001-512823 A     8/2001
JP     2004-69664 A     3/2004
(Continued)

OTHER PUBLICATIONS

Australian Office Action dated Jul. 31, 2023 in Australian Application No. 2018390983.
(Continued)

*Primary Examiner* — Jyoti Nagpaul
(74) *Attorney, Agent, or Firm* — Sughrue Mion, PLLC

(57) ABSTRACT

The present invention relates to a fluid transport system for an automated slide treatment apparatus for treating one or more tissue samples disposed on slides, whereby the slide treatment apparatus includes a plurality of slide treatment modules arranged to receive ones of the slides, and the fluid transport system includes a fluid dispensing robot configured by a controller to dispense a plurality of reagents to said ones of the slides received in the slide treatment modules to treat said one or more tissue samples respectively.

19 Claims, 19 Drawing Sheets

(51) Int. Cl.
    *G01N 35/00*    (2006.01)
    *G01N 35/10*    (2006.01)

(52) U.S. Cl.
    CPC ..... *G01N 35/1004* (2013.01); *G01N 35/1072* (2013.01); *G01N 35/1081* (2013.01); *G01N 2035/00059* (2013.01); *G01N 2035/00138* (2013.01)

(56) References Cited

U.S. PATENT DOCUMENTS

| | | |
|---|---|---|
| 2002/0009391 A1 | 1/2002 | Marquiss et al. |
| 2003/0068189 A1 | 4/2003 | Tsaur |
| 2003/0203493 A1 | 10/2003 | Lemme et al. |
| 2006/0093520 A1 | 5/2006 | Lemme |
| 2008/0240898 A1 | 10/2008 | Manz et al. |
| 2009/0318786 A1 | 12/2009 | Blank et al. |
| 2015/0276772 A1 | 10/2015 | Dockrill et al. |
| 2016/0084862 A1 | 3/2016 | Feingold et al. |
| 2017/0292899 A1 | 10/2017 | Kasamatsu et al. |
| 2020/0139360 A1 | 5/2020 | Limbach et al. |

FOREIGN PATENT DOCUMENTS

| | | |
|---|---|---|
| JP | 2005-524068 A | 8/2005 |
| JP | 2015-533418 A | 11/2015 |
| WO | 93/25913 A1 | 12/1993 |
| WO | 2016/047625 A1 | 3/2016 |

OTHER PUBLICATIONS

International Search Report for PCT/AU2018/051358 dated Feb. 26, 2019 [PCT/ISA/210].
Extended European Search Report dated Sep. 11, 2020 from the European Patent Office in Application No. 18892303.1.
Written Opinion for PCT/AU2018/051358 dated Feb. 26, 2019 [PCT/ISA/237].
Communication dated Apr. 5, 2022 from the Japanese Patent Office in Japanese Application No. 2020-501248.
Office Action issued Feb. 2, 2024 in Chinese Application No. 201880043857.8.
Korean Office Action dated Mar. 20, 2024 in Application 10-2020-7001892.

* cited by examiner

FLUID TRANSPORT SYSTEM

CROSS REFERENCE TO RELATED APPLICATIONS

This application is a continuation of U.S. application Ser. No. 16/620,276, filed Dec. 6, 2019, which is a National Stage of International Application No. PCT/AU2018/051358 filed Dec. 19, 2018, claiming priority based on Australian Patent Application No. 2017905115 filed Dec. 21, 2017, the disclosures of which are incorporated herein by reference in their entirety.

TECHNICAL FIELD

The present invention relates to a fluid transport system for an automated slide treatment apparatus for treating one or more tissue samples disposed on slides, whereby the slide treatment apparatus includes a plurality of slide treatment modules arranged to receive ones of the slides.

The present invention relates particularly, but not exclusively, to a fluid dispensing robot configured by a controller to dispense a plurality of reagents to the slides received in the slide treatment modules to treat the one or more tissue samples. The fluid dispensing robot includes a fluid dispensing head with one or more probes having a body with one or more channels arranged to receive ones of the reagents to be dispensed. The fluid dispensing robot is configured to select one of the probes and/or one of the channels for a selected one of the reagents and to dispense the selected one of the reagents to the slides received in the slide treatment modules.

BACKGROUND TO THE INVENTION

Existing tissue sample treatment methods, in some applications, comprise a number of steps that are performed manually. For example, in immunologic applications, such as in-situ hybridization (ISH) and immunohistochemical (IHC) applications, some steps, including baking a sample onto a slide, dewaxing, and epitope retrieval, are performed manually by an operator to treat the tissue sample before it can be used in a staining apparatus for staining the tissue sample according to a predetermined staining protocol.

Immunohistochemical staining and in situ nucleic acid analysis are tools used in histological diagnosis and the study of tissue morphology. Immunohistochemical staining relies on the specific binding affinity of antibodies with epitopes in tissue samples, and the increasing availability of antibodies which bind specifically with unique epitopes present only in certain types of diseased cellular tissue. Immunohistochemical staining involves a series of treatment steps conducted on a tissue sample (typically a section) mounted on a glass slide to highlight, by selective staining, certain morphological indicators of disease states.

Typical treatment steps include pre-treatment of the tissue sample to reduce non-specific binding, antibody treatment and incubation, enzyme labelled secondary antibody treatment and incubation, substrate reaction with the enzyme to produce a fluorophore or chromophore highlighting areas of the tissue sample having epitopes binding with the antibody, counterstaining, and the like. Between each treatment step, the tissue sample must be rinsed to remove unreacted residual reagent from the prior step. Most treatment steps involve a period of incubation typically conducted at ambient temperature of around 25° C. up to around 40° C., while cell conditioning steps are typically conducted at somewhat higher temperatures, e.g. 90° C. to 100° C. In-situ DNA analysis relies upon the specific binding affinity of probes (DNA binding proteins) with unique nucleotide sequences in cell or tissue samples and similarly involves a series of process steps, with a variety of reagents and process temperature requirements. Some specific reactions involve temperatures up to 120° C. to 130° C.

With reference to the above example, tissue samples are preserved in formalin and presented on microscope slides with a layer of paraffin wax protecting the sample. Thus, treatment in the form of at least dewaxing by heat and/or use of bulk fluid reagents is required to be performed by the operator on the slide before treatment in the form of staining of a sample can take place. For example, dewaxing is typically achieved by the operator manually dunking the slide in a dewaxing solution (e.g. a dewaxing reagent) to prepare the sample for staining. Also, the sample may be further treated by manually immersing the slide in another reagent, such as alcohol, to dehydrate the sample before staining can take place. In any event, the dewaxed sample on the slide is typically loaded into the staining apparatus by the operator for staining and is later retrieved by the operator after the staining process has been completed for viewing by, say, a pathologist.

Attempts have been made to automatically treat tissue samples disposed on slides for immunologic applications using, for example, an automated tissue sample staining apparatus. In an existing example, the automated staining apparatus treats tissue samples using reagents to treat the sample before staining the samples on the slides. The treatment of the samples is performed automatically by one or more robots configured to dispense a plurality of designated reagents to slides in a predetermined sequence according to a staining protocol. In addition, the robots can be configured to dispense reagents such as dewaxing solution and alcohol to treat the samples on slides before and after staining. The reagent currently being dispensed by one of the robots, however, must be purged from the robots before other reagents can be dispensed causing delay, reagent wastage and inefficient use of the automated staining apparatus.

SUMMARY

According to one aspect of the present invention, there is provided a fluid transport system for an automated slide treatment apparatus for treating one or more tissue samples disposed on slides, the apparatus including a plurality of slide treatment modules arranged to receive ones of the slides, the fluid transport system including:

a fluid dispensing robot configured by a controller to dispense a plurality of reagents to said ones of the slides received in the slide treatment modules to treat said one or more tissue samples respectively, wherein the fluid dispensing robot includes:

a fluid dispensing head having one or more probes extending therefrom, each of the probes having a body with one or more channels arranged to receive one of the reagents to be dispensed, wherein each of the reagents to be dispensed are pumped from a plurality of corresponding reagent containers via a pumping means configured by the controller, wherein the fluid dispensing robot is configured to select one of the probes and/or one of the channels for a selected one of the reagents and to dispense said selected one of the reagents to said ones of the slides received in the slide treatment modules.

In preferred embodiments, the fluid dispensing robot is configured by the controller to dispense a plurality of reagents including high value reagents and bulk fluid reagents to ones of the slides received in the slide treatment modules. The reagents include bulk fluid reagents such as oxalic acid, sulphuric acid, potassium permanganate, alcohol, dewaxing agent, haematoxylin, peroxide, citric acid, EDTA, bluing agents, DI water, and BOND™ wash; and high value reagents such as, for example, chromogens, ISH probes, fluorescents, IHC probes, antibodies, PCR reagents.

Preferably, the fluid transport system includes one or more wash robots configured by the controller to dispense bulk washing reagents such as DI water, and BOND™ wash.

Ideally, the fluid dispensing robot may be configured by the controller to move the fluid dispensing head having the one or more probes in x, y and z axes with a driving means to locate the selected probe in a position relative to one of the slide treatment modules to dispense the selected one of the reagents. Here, the driving means includes an x axis driver configured by the controller to move the fluid dispensing head in the x axis, a y axis driver configured by the controller to move the fluid dispensing head in the y axis, and a z axis driver configured by the controller to move the fluid dispensing head in the z axis. Also, the fluid dispensing robot may be configured by the controller to rotably move the fluid dispensing head in a θ axis with the driving means. Here, the driving means includes a θ axis driver configured by the controller to move the fluid dispensing head in the θ axis. For example, the drivers are actuators such as solenoid or pneumatic actuators, motors, steppers and the like. Alternatively, the fluid dispensing robot may be part of single dispense robot for X-Y movement and positioning.

In an embodiment, the fluid dispensing head includes a barrel having each of the probes spaced substantially about a periphery of the barrel and arranged to be rotated in the θ axis. For example, the fluid dispensing head has ten probes extending therefrom spaced circumferentially about the barrel. The fluid dispensing robot is configured to select one of the probes for a selected one of the reagents and then rotate the barrel and move the fluid dispensing head in the x, y and z axes as required to locate the selected probe in the required position relative to the slide treatment module to dispense the selected reagent to a slide located therein.

In another embodiment, the fluid dispensing head further includes a plurality of z axis actuators each configured by the controller to independently move a corresponding one of the probes in the z axis. In this case, for example, the fluid dispensing robot is also configured to select one of the probes for a selected one of the reagents and then rotate the barrel and/or move the fluid dispensing head in the x and y axes. Alternatively, a fixed head rotating actuator may be utilized to engage probes in Z direction. The actuator then moves the selected probe in the z axis to locate the selected probe in the required position relative to the slide treatment module to dispense the selected reagent to a slide located therein.

Also, each of the probes may include a nozzle disposed at a distal end of the probes to dispense the reagents. The nozzle of each of the probes is typically arranged to couple with a cover member in one of the slide treatment modules and substantially sealingly mate with an inlet port of said cover member whilst said one of the reagents is being dispensed. Also, the fluid dispensing robot is configured to urge the nozzle of the probe in the z axis towards the inlet port of said one of the slide treatment modules with the driving means whilst said one of the reagents is being dispensed to maintain the seal with the inlet port. For example, the above described z axis actuator is configured to urge the nozzle of the probe towards the inlet port of the slide treatment module. The cover member is described in International Publication No. WO2014/066950 entitled "Slide Staining Assembly and Cover Member" having an earliest priority date of 1 Nov. 2012, the contents of which are hereby incorporated herein by reference.

In an embodiment, the pumping means includes a plurality of pumps, each of said pumps associated with each one of the plurality of reagents for pumping the reagents to each one of the channels and/or each one of the probes via a plurality of corresponding reagent lines.

In an embodiment, the fluid transport system further includes a wash station for washing the one or more probes when inserted in a wash drum or bath thereof. The wash station may be positioned at any location including in close proximity to, or integral with, the fluid dispensing robot. In an example, the wash fluid is supplied to the wash station by a selected one of the probes.

According to another aspect of the present invention, there is provided a method of transporting fluid for treatment of one or more tissue samples disposed on slides whereby ones of the slides are received in a plurality of slide treatment modules and a plurality of reagents are dispensed by at least one fluid dispensing robot to said ones of the slides received in the slide treatment modules to treat said one or more tissue samples respectively, the method including:

pumping the reagents to be dispensed from a plurality of corresponding reagent containers to one or more probes extending from a fluid dispensing head of the fluid dispensing robot, each of the probes having a body with one or more channels arranged to receive one of the reagents to be dispensed;

selecting one of the probes and/or one of the channels for a selected one of the reagents; and dispensing said selected one of the reagents to said ones of the slides received in the slide treatment modules.

According to another aspect of the present invention there is provided a computer program code which when executed by a controller implements the above method.

According to another aspect of the present invention there is provided a tangible computer medium comprising the above computer program code.

According to yet another aspect of the present invention there is provided a data file comprising the above program code.

BRIEF DESCRIPTION OF THE DRAWINGS

Embodiments of the present invention will now be described, by way of example only, with reference to the accompanying drawings, in which:

FIG. 5b is a simplified view of the fluid dispensing head of FIGS. 5 and 5a;

DETAILED DESCRIPTION

Figure 1:
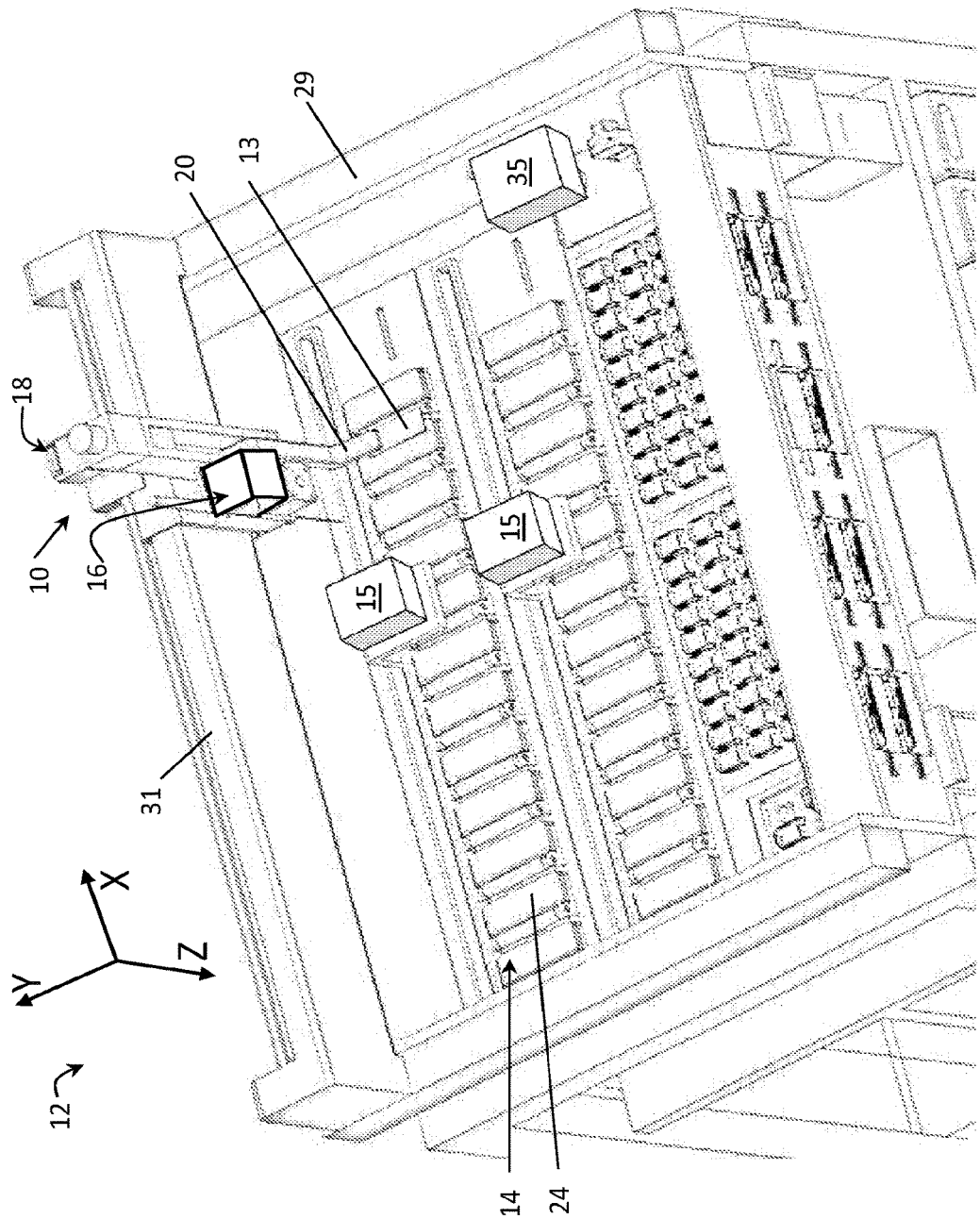
FIG. 1 is a perspective view of an automated slide treatment apparatus having a fluid transport system according to an embodiment of the present invention.

A fluid transport system 10 for an automated slide treatment apparatus 12 for treating tissue samples disposed on slides 13 is shown in FIG. 1. The slide treatment apparatus 12 includes a plurality of slide treatment modules 14 arranged to receive the slides 13, and includes at least one slide transport robot 18, in the form of a gantry robot configured by a controller (not shown), to move the slides 13 to and from the slide treatment modules 14. The fluid transport system 10 includes a fluid dispensing robot 16 configured by the controller to dispense a plurality of reagents to the slides 13 received in the slide treatment modules 14 to treat the tissue samples on the slides 13.

In the embodiment shown in FIG. 1, the fluid transport system 10 includes one fluid dispensing robot 16 configured by the controller to dispense reagents to the slides 13 in the slide treatment modules 14 and two wash robots 15 configured by the controller to dispense a plurality of lesser value reagents stored in reagent containers to the slides 13 received in the slide treatment modules 14. As above, the lesser value reagents are typically wash reagents such as DI water and BOND™ wash.

It will be appreciated by those persons skilled in the art that, in some cases, to treat the tissue samples on the slides 13, a designated combination and order of higher and lesser value (e.g. bulk) reagents are dispensed to a slide. It will also be appreciated that the apparatus 12 may include two or more fluid dispensing robots 16 such that one may be devoted to (or used predominantly for) dispensing high value reagents and another may be used to dispense lower value or bulk fluid reagents. Bulk fluid reagents include e.g., oxalic acid, sulphuric acid, potassium permanganate, alcohol, dewaxing agent, haematoxylin, peroxide, citric acid, EDTA, DI water and BOND™ wash to treat the tissue samples disposed thereon.

In the embodiment shown, the two wash robots 15 shown in FIG. 1 are disposed on the apparatus 12 to dispense wash reagents to two rows of slide treatment modules 14. Also, the slide transport robot 18 is configured to move the slides 13 to and from the slide treatment modules 14 without interfering with the wash robots 15 as the slide transport robot 18 can move the slides 13 in the z direction over the wash robots 15. As shown in FIG. 1, the x axis is along a length of the apparatus 12, the y axis is along a width of the apparatus 12 and the z axis corresponds to a height of the apparatus 12. As above, it will also be appreciated, however, that other configurations of wash robots 15 are envisaged, such as the apparatus 12 including one wash robot 15 configured to move in the x, y and z axes relative to the apparatus 12.

As described, the slide transport robot 18 is configured by the controller to move in the x, y and z axes to move slides 13 in and out of the slide treatment modules 14 so that samples disposed on the slides 13 can be treated with reagents in the slide treatment modules 14. The slide transport robot 18 is a gantry robot and is combined with the fluid dispensing robot 16. The fluid dispensing robot 16 (hereinafter referred to as FT robot 16) is configured by the controller to dispense a plurality of reagents stored in reagent containers to the slides 13 in the slide treatment modules 14. Examples of high value reagents include chromogens and antibodies while examples of bulk fluid reagents include oxalic acid, sulphuric acid, potassium permanganate, alcohol, dewaxing agent, haematoxylin, peroxide, citric acid, and EDTA.

Figures 7A, 7B:
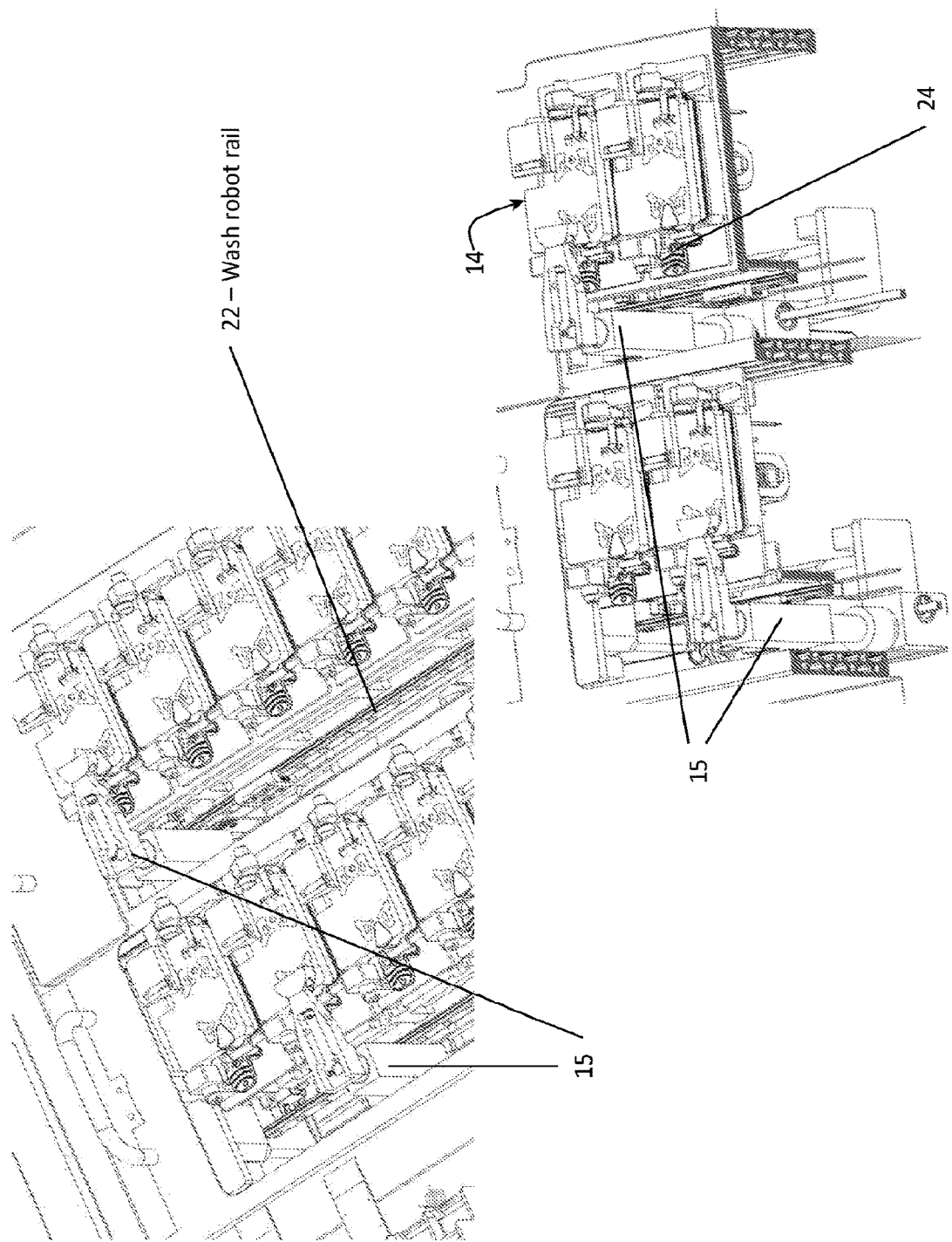
FIGS. 7a and 7b are enlarged views showing wash robots 15 according to an embodiment of the present invention.

The wash robots 15 shown in FIG. 1 are configured to move in the x axis along a rail 22 to locate the slide 13 in the slide treatment modules 14 into which the wash reagent is to be dispensed. Once located, the wash robots 15 move in the z and θ directions to dispense the wash reagents (such as DI water and BOND™ wash) to the slides 13. FIGS. 7a and 7b are enlarged views showing wash robots 15 which are moveable along rails 22 to locate a designated slide treatment module 14 for washing. Once suitably located along the x-axis, wash robot 15 moves the wash probe in the z-axis (and if necessary, around the θ axis) to couple with an inlet port 32 in cover member 24 covering slide 13 for washing the sample with e.g. DI water or BOND™ wash.

The FT robot 16 of the embodiment of FIG. 1 is shown in more detail in FIGS. 3, 3a, 4, 5, 5a, 5b and 5c, with the FT robot 16 having a fluid dispensing head 17. Also, another embodiment of the FT robot 16 is shown in more detail in FIG. 17.

Figure 2:
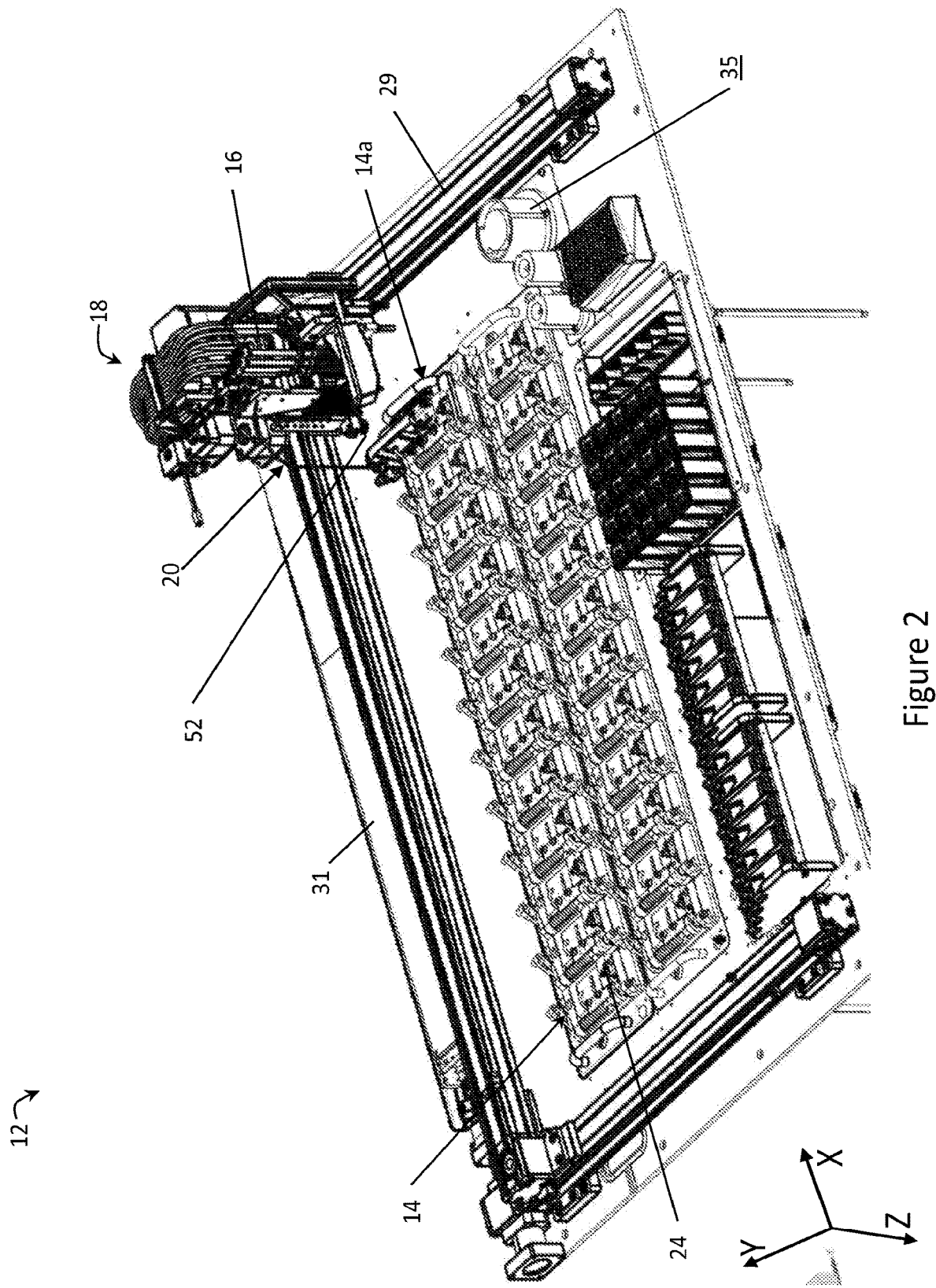
FIG. 2 is a perspective view of the automated slide treatment apparatus of FIG. 1 holding a plurality of slide treatment modules, one of which is in an open configuration, according to an embodiment of the present invention.

FIG. 2 shows an embodiment of the fluid transport system 10 with slide transport robot 18 configured to move along x-axis rail 29 and y axis rails 31 to move a slide 13 to a designated slide treatment module 14. In some embodiments, a treatment module actuator is provided on the dispensing head 17 of FT robot 16 and is operable to move a slide treatment module 14 between open and closed configurations (or from a closed to an open configuration only, if the slide treatment apparatus 14 is biased to the closed configuration). The treatment module actuator may be permanently positioned or retractable with respect to the dispensing head 17, under control of the controller. In one embodiment, the treatment module actuator is a u-shaped member or hook 52 operable to engage an opening mechanism on the slide treatment module 14 causing it to pivot to an open configuration as shown at 14a. Once the slide treatment module 14 is in an open configuration, slide transport robot 18 is able to pick up or place a slide 13 within the slide treatment module 14. In another embodiment, the treatment module actuator is a finger-shaped member operable to engage the opening mechanism on the slide treatment module 14. The finger-shaped member can also open and close the slide treatment module 14 in an uncontrolled state, i.e. where FT robot 16 does not know where the opening mechanism is, as it can just move towards the opening mechanism and open or close the slide treatment module 14 without knowing its position in the x axis.

Figure 3A:
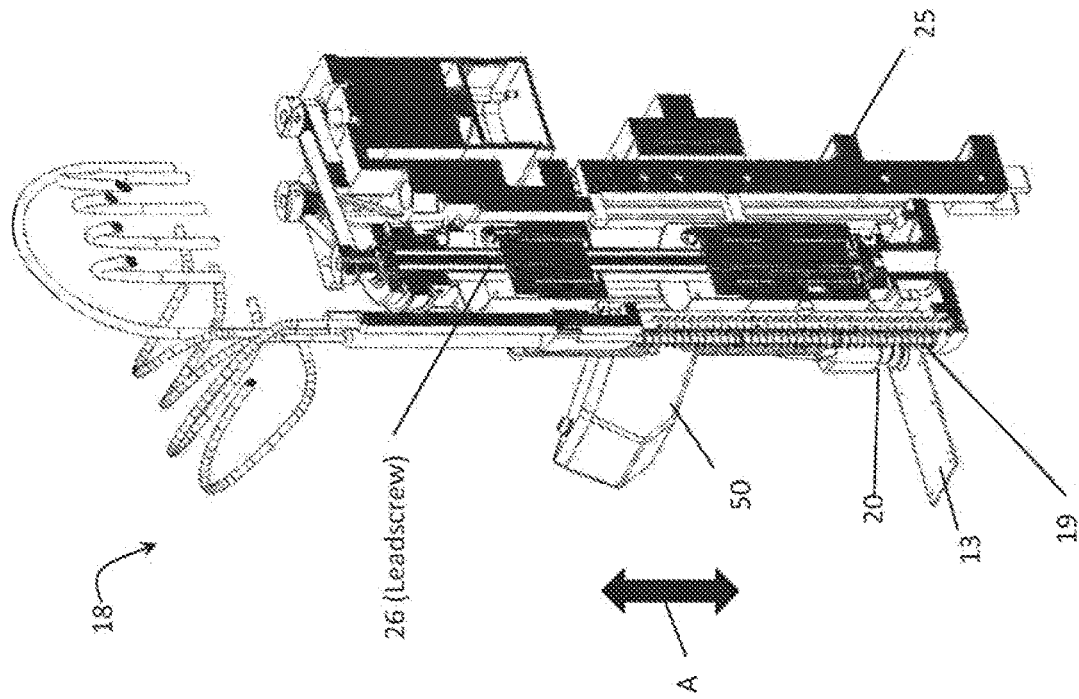
FIG. 3*a* is a sectional view of the fluid dispensing head of FIG. 3.
Figure 3:
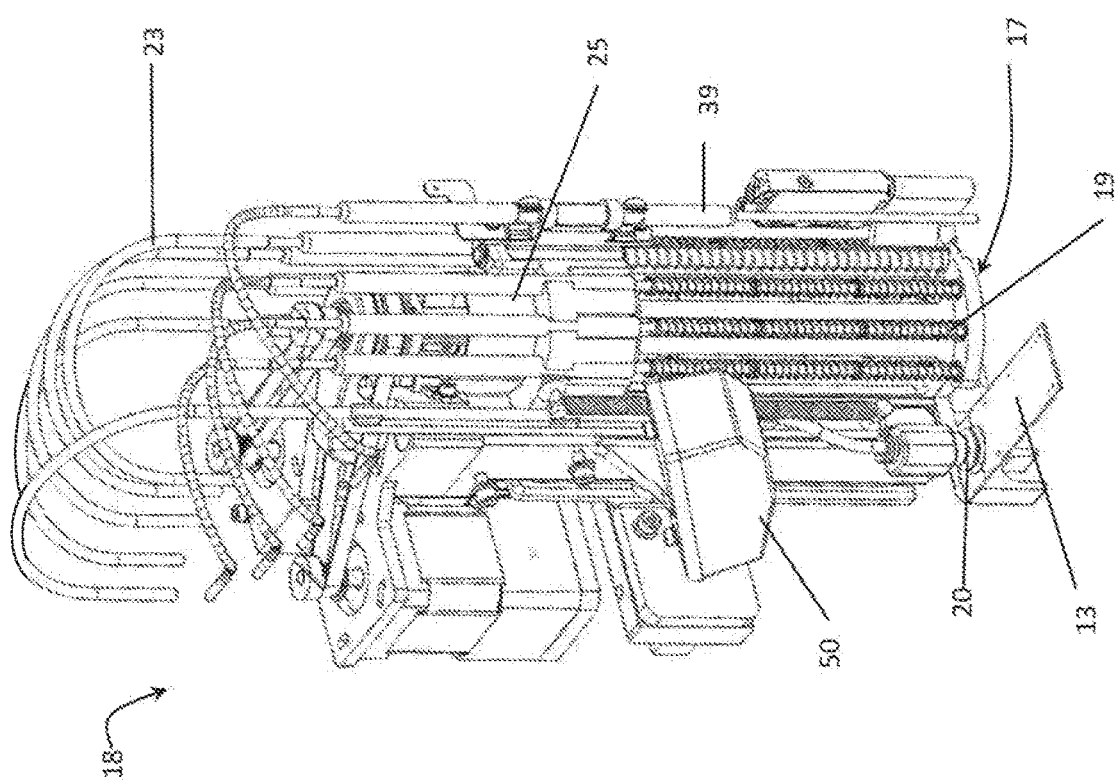
FIG. 3 is a perspective view of a fluid dispensing head of a fluid dispensing robot according to an embodiment of the present invention.

Referring now to FIGS. 3 and 3a, the fluid dispensing head 17 has a plurality of probes 19 extending therefrom in the z axis to dispense reagents. The probes 19 each have an elongated body with a channel 21 (shown in one embodiment in FIG. 6) extending therethrough arranged to receive one of the reagents to be dispensed. The probes 19 may be arranged around barrel 25 in groups, e.g. with hazardous reagent probes grouped and non-hazardous reagent probes grouped for ease of washing. In some embodiments, fluid dispensing head 17 has an additional high value fluid transfer probe 39 (hereinafter HV probe 39) which is operable separately to the probes 19 around barrel 25. Ideally, HV probe 39 is placed close to the front of the fluid dispensing head 17 for ease of maintenance and replacement and may be self-aligning.

Figure 4:
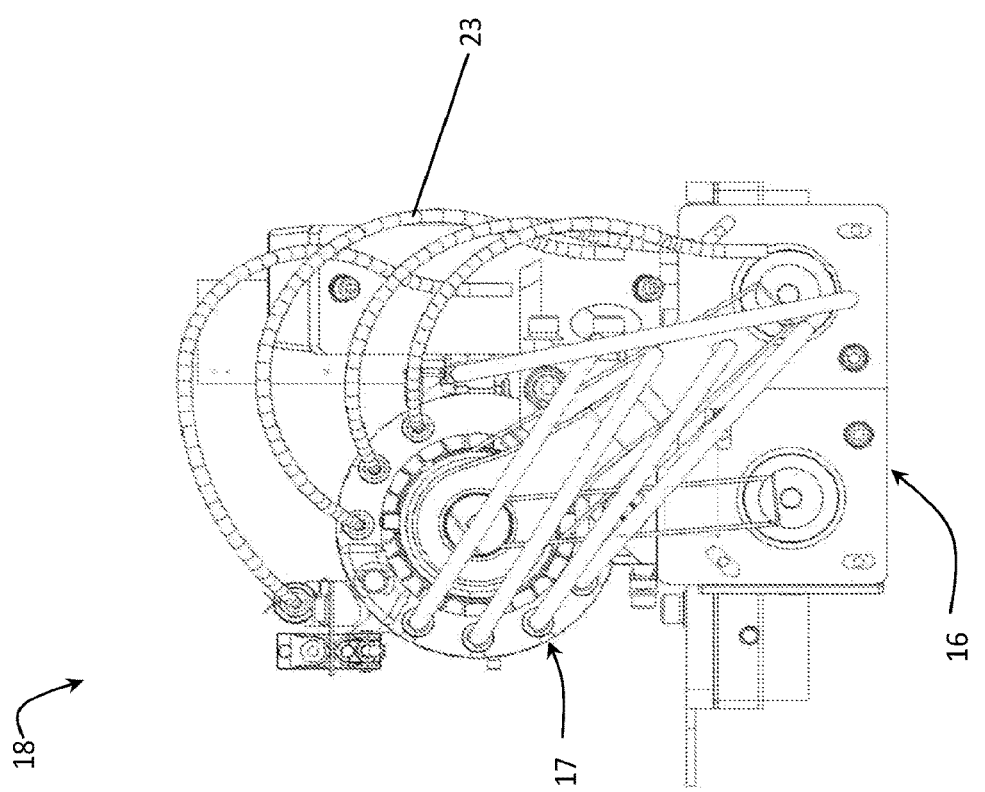
FIG. 4 is a top view of a slide transport robot and fluid dispensing robot according to an embodiment of the present invention.
Figure 6:
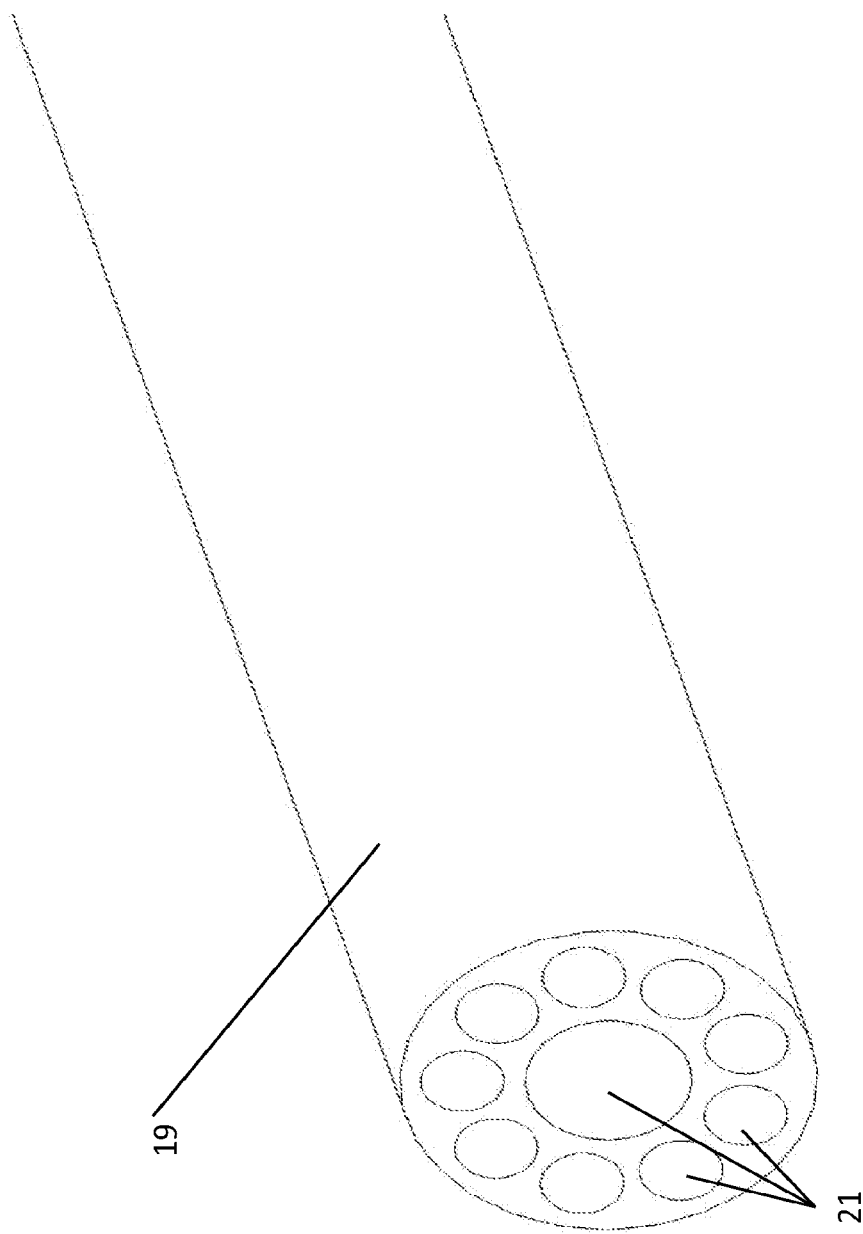
FIG. 6 is a perspective view of a probe having a plurality of channels according to another embodiment of the present invention.

As discussed above, fluid dispensing head 17 may comprise an integrated slide transport device 20. However, it is desirable that the fluid dispensing head 17 is arranged to remain within the width of carriage along rails 29, 31, to minimise dead space within the slide treatment apparatus 12. The reagents are pumped from a plurality of corresponding reagent containers (not shown) via a pumping means (not shown) configured by the controller (not shown). In an example, the apparatus 12 includes a plurality of pumping means, each of which are associated with each of the plurality of reagents, for pumping the reagents to an output nozzle of the probes 19 of the FT robot 16 from the reagent containers. In FIGS. 3 and 4, each of the probes 19 have a single channel 21 associated with a corresponding reagent. In FIG. 6, one probe 19 of the fluid dispensing head 17 has a plurality of channels 21 extending therethrough. Here, each of the channels 21 are arranged to receive reagents to be dispensed. In this embodiment, the FTP robot 16 selects one of the channels 21 for a selected one of the reagents to be pumped and dispensed. In this case, only one probe 19 is required to be located in a position relative to the slide treatment module 14 to dispense each of the reagents connected to the channels 21 to the slide 13 received therein. It will be appreciated by those persons skilled in the art, however, that multiple probes to dispense multiple reagents, each with multiple channels, could be employed by the apparatus 12. Thus, in one embodiment a single fluid dispensing head 17 having, say, fifteen probes 19 could dispense twenty or more reagents by incorporating multiple channels 21 into the total number of probes 19. It is to be understood that many probe/channel combinations are contemplated for the fluid dispensing head 17 and all are within the scope of the present invention.

Referring back to an embodiment where each probe 19 has a single channel 21 for dispensing a reagent, the plurality of pumping means are configured to pump reagents to a respective output nozzle of the probes 19 from the respective reagent containers. In order for the reagents to be dispensed, the apparatus 12 includes a plurality of reagent lines 23 associated with each of the reagents which extend from each of the reagent containers via the respective pumps to the probes 19. That is, the apparatus 12 typically includes dedicated pumping means (e.g. pump) for each reagent and dedicated reagent lines 23 extending from each reagent container via each pump to the FT robot 16. Thus, in an example where there are ten reagents stored in ten different reagent containers and there is one FT robot 16, ten dedicated reagent lines 23 extend from each of the ten containers to the FT robot 16 via ten in-line pumps. For instance, there are dedicated reagent lines 23 for dewax solution, alcohol, ER1, ER2, haematoxylin, peroxide, enzyme cleaning solution, $H_2SO_4$ cleaning solution $KMnO_4$ cleaning solution, and oxalic acid cleaning solution.

FIG. 4 is a top view showing slide transport robot 18 with reagent lines 23 that feed probes 19 in FT robot 16 in fluid dispensing head 17. The reagent lines 23 are supplied by reagent containers (not shown) and with probes. In an embodiment, the reagent lines 23 are made from non-reactive plastic or polymer material although they may be coated, ideally externally, to minimise friction and ultimately damage from regular contact with other reagent lines 23 and components in the fluid dispensing head 17. One or more reagent lines 23 may also include a rotary valve to direct inflow and outflow of fluid.

In any event, the FT robot 16 is configured by the controller to select one of the probes 19 for a selected one (or more, for a multi-channel probe) of the reagents to be dispensed. The FT robot 16 selects a probe 19 out of the plurality of probes 19 and locates the selected probe 19 in a position relative to the designated slide treatment module 14 so that the selected reagent can be dispensed. That is, the FT robot 16 is configured by the controller to move the fluid dispensing head 17 having the probes 19 in the x, y and/or z axes with a suitable driving means (e.g. x, y and z axis actuators) to locate the selected probe 19 in the desired position relative to the slide treatment module 14 to dispense the selected reagent. In addition, or in the alternative, the FT robot 16 is configured by the controller to rotably move the fluid dispensing head 17 around a θ axis with a suitable θ axis driver. In this embodiment, the FT robot 16 selects the probe 19 by rotating a barrel 25 of the fluid dispensing head 17, which has the probes 19 spaced substantially about its periphery, about the θ axis. For example, the θ axis driver drives a shaft to rotate the barrel 25 so that the selected probe 19 is located above the designated slide treatment module 14. The FTP robot 16 then lowers the selected probe 19 in the z direction to engage the designated slide treatment module 14. The FT robot 16 is then configured to dispense the selected one of the reagents to the slide 13 received in the designated slide treatment module 14.

Figure 5A:
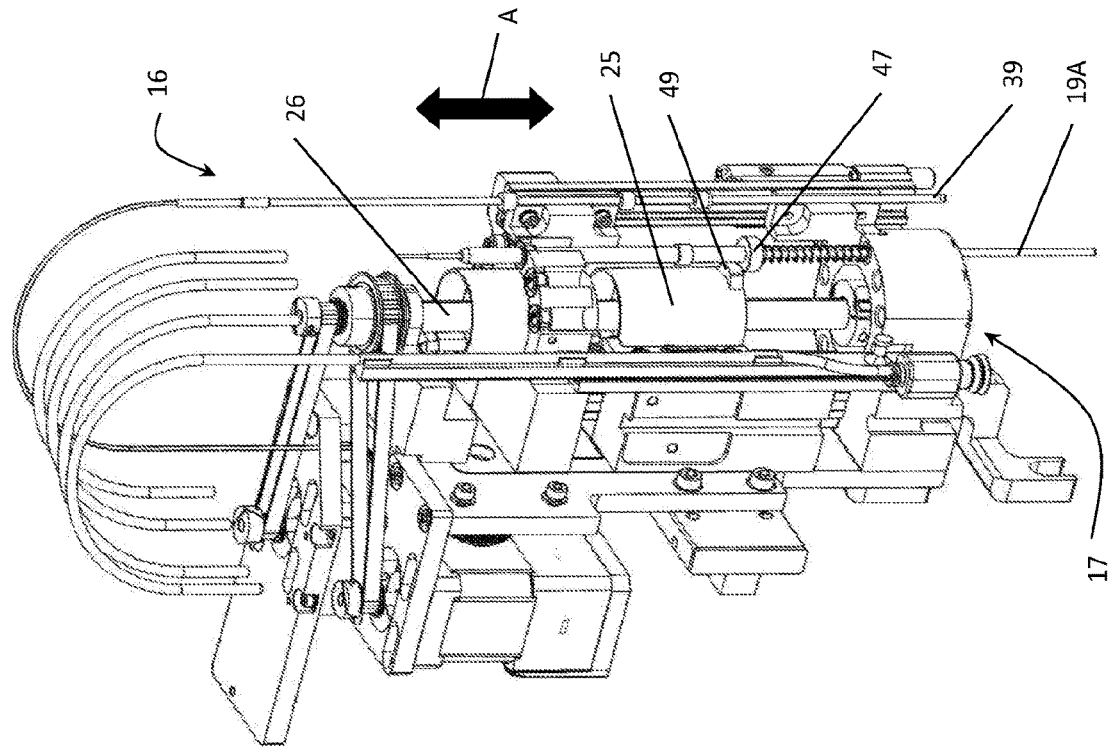
FIG. 5a is a simplified view of the fluid dispensing head of FIG. 5, showing a probe selector and probe collar.
Figure 5:
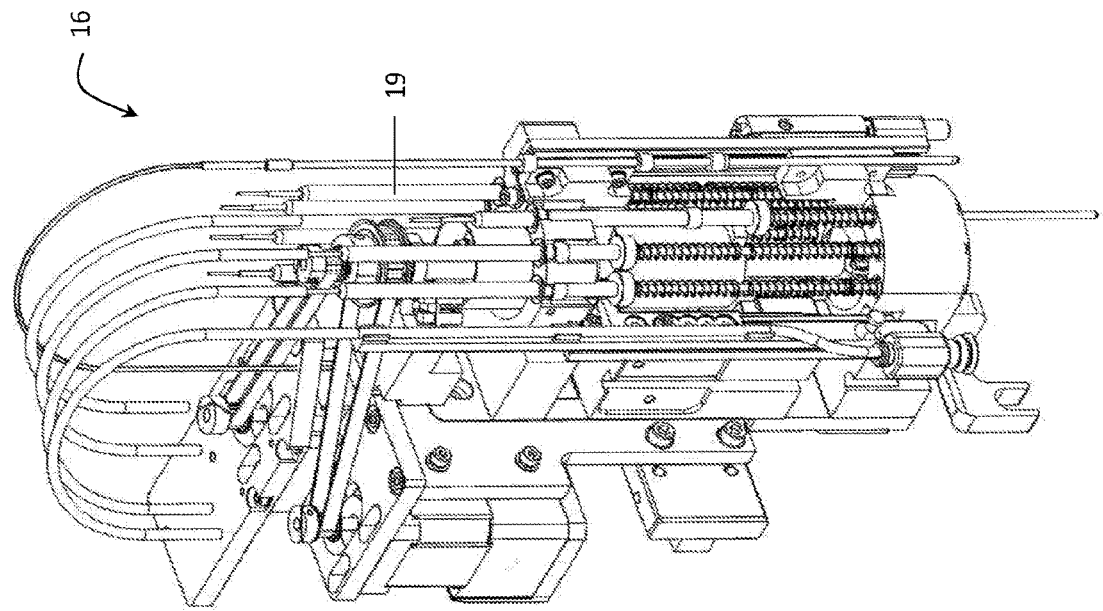
FIG. 5 is a perspective view of a fluid dispensing head of a fluid dispensing robot according to an embodiment of the present invention.

With reference to the embodiment shown in FIGS. 5 and 5a, the barrel 25 has seven probes 19 extending therefrom spaced circumferentially about the barrel 25. The FT robot 16 is configured to select one of the probes 19A for a selected one of the reagents and rotates the barrel 25 so that the selected probe 19A is located in line with a z axis actuator 26 configured to move in the direction of the arrow A (i.e. in the z axis). The z axis actuator 26 (e.g. a leadscrew and nut) depresses the selected probe 19A e.g. by engaging probe selector 49 with probe collar 47 after the fluid dispensing head is moved in the x axis (and y axis in some other embodiments) so as to urge the selected probe 19A into the required position relative to the designated slide treatment module 14 to dispense the selected reagent to a slide located therein. Ideally, the z axis actuator 26 is run at a ratio to the θ axis driver 37 in the range of 1:1 to 10:1, preferably in the range of about 2:1:6:1 and more preferably about 3:1.

Figure 8:
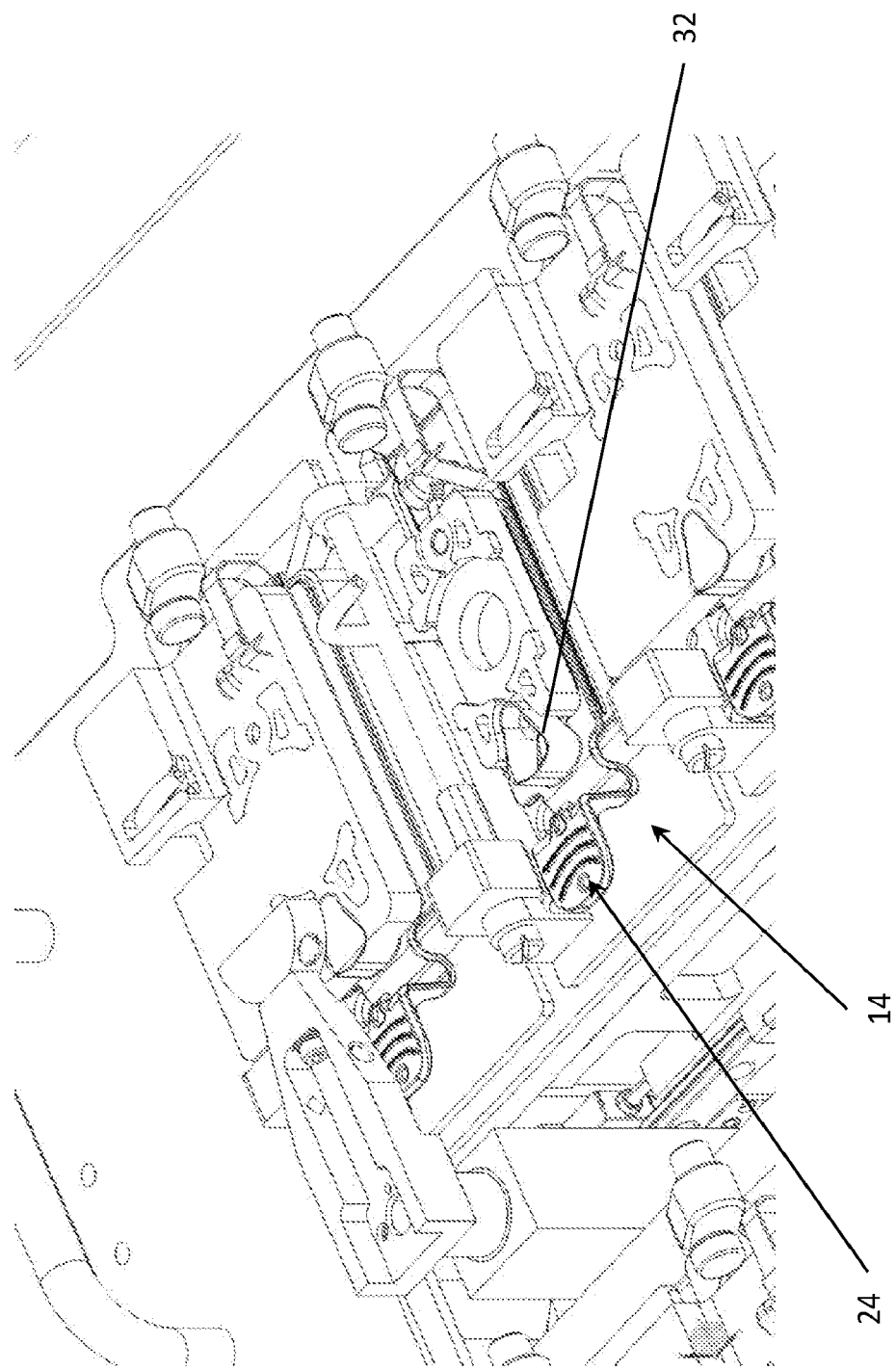
FIG. 8 is a perspective view of a slide treatment module.

In more detail, each of the probes 19 includes a nozzle disposed at a distal end of the probe 19 to dispense the reagent/s. The nozzle of each of the probes 19 is arranged to couple with a cover member 24, shown in FIG. 8, of one of the slide treatment modules 14 (with the top cover of the module removed for clarity) and substantially sealingly mate with an inlet port 32 of the cover member 24 whilst the selected reagent is being dispensed. With reference to the embodiment of FIGS. 5 and 5a, the FT robot 16 is configured to urge the nozzle of the selected probe 19A in the z axis using the z axis actuator 26 towards the inlet port 32 of the slide treatment module 14 whilst the reagent is being dispensed to maintain a seal with the inlet port 32. Ideally, single ones of the nozzles of the probes 19, 39, are removable for maintenance or replacement without disrupting or moving other dispense tips or the probes to which they are attached. Similarly, it is desirable that the core mechanisms of the actuators of the fluid dispensing head 17 are removable without moving the probes 19, 39 or dispense tips.

In some embodiments, at least one probe 19 is configurable to remove material such as liquid or tissue debris from the slide 13 in the slide treatment module 14. This may involve applying a negative pressure (suction or a vacuum) to the slide via a channel 21 in the probe. In some embodiments, such a probe may be configurable, e.g. with a rotary valve in reagent line 23, for bi-directional fluid transport such that fluid and/or debris may be removed and the slide treatment module 14 evacuated, and also permitting fluid to enter the module 14. This feature can be exploited for agitation of fluid on the slide 13 and may be achieved by the controller applying a sequence of fluid evacuation and dispensing actions into the slide treatment module 14. In some embodiments, one or more probes 19, 39 may also be configured to remove fluid from mixing vials (not shown) and/or withdraw and transport one or more aliquots of fluid from a mixing vial to one or more slide treatment modules.

The cover member 24 is described in International Publication No. WO2014/066950 entitled "Slide Staining Assembly and Cover Member" having an earliest priority date of 1 Nov. 2012, the contents of which are hereby incorporated herein by reference.

Further, the inlet port 32 of the cover member 24 may have a chamfer (not shown), for example a 45 or 60 degree chamfer, to guide and to seal with the nozzle of the probe 19. Also, in an embodiment, the diameter of the probe 19 of the FT robot 16 is smaller than the diameter of the probe for the wash robot 15 configured to dispense wash reagents. Thus, the smaller diameter tip of probe 19 of the FT robot 16 is received deeper into the chamfered inlet port 32.

For example, the z axis actuator 26 urges the nozzle of the probe 19 in the z axis towards the inlet port 32 of the slide treatment module 14 whilst the reagents are being dispensed with a 4 to 20 N force. In other embodiments, the force may be larger depending on the application. The z axis actuator 26 urges the nozzle with e.g. a 4 N force on the probe 19 towards the inlet port 32 using a stepper motor in constant torque mode. Alternatively, the z axis actuator 26 may be a pneumatic actuator, where the coupling force is adjusted by the air pressure and is constant throughout the stroke. Also, for instance, spring actuation and solenoid actuation could be used to supply the requisite force to seal the nozzle of the probe 19 with the inlet port 32 of the cover member. In the case of solenoid activation, a latching solenoid could be used to latch the probes 19 in the retracted position. Furthermore, also envisaged is a servo motor actuation to provide improved torque control.

In addition, the z axis actuator 26 provides a powered return stroke to the selected probe 19 in the z axis away from the inlet port 32 of the slide treatment module 14 after the reagent has been dispensed. Also, it can be seen in FIGS. 5 and 5a that each of the probes 19 may be spring loaded and biased to return to the retracted position (i.e. non-selected) when reagent dispensing by that probe is complete. Thus, the probes 19 can be held or biased in the retracted position when the z axis actuator 26 is powered off. Also, the powered return stroke minimises the chance of the springs catching and reduces the maximum spring force required.

Figure 5C:
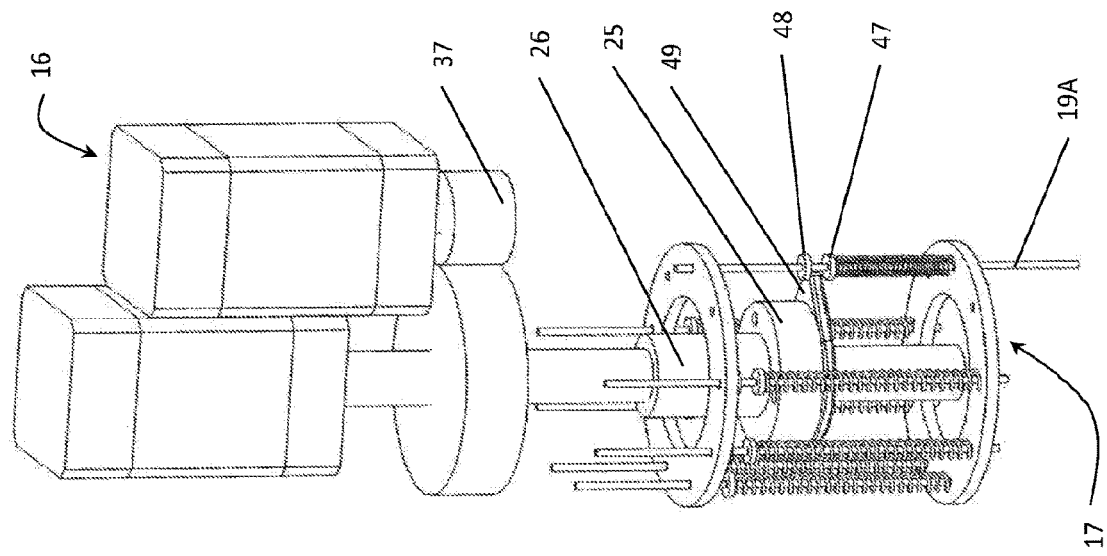
FIG. 5c shows a θ axis driver for rotating the barrel shown in FIG. 5b.
Figure 5B:
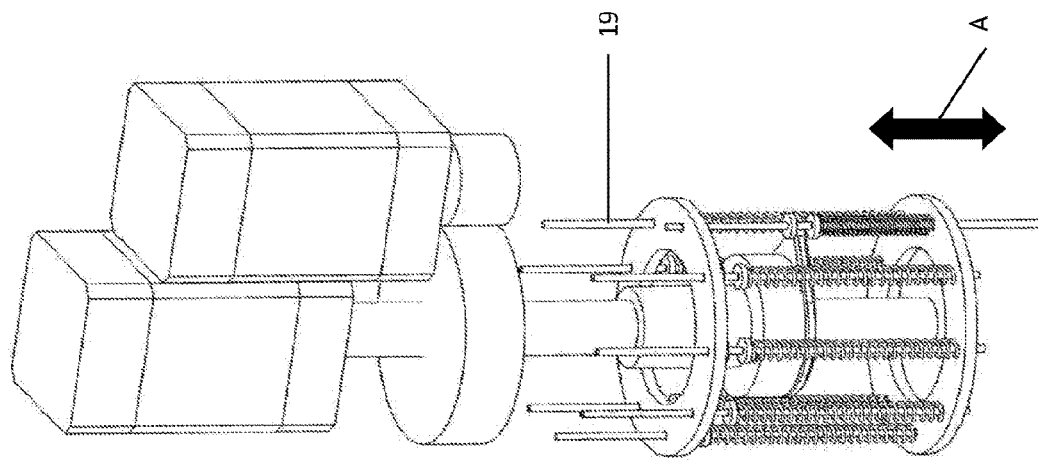

FIGS. 5b and 5c show simplified version of the fluid dispensing head 17 showing barrel 25 with probes 19. In FIG. 5c, θ axis driver 37 rotates barrel 25 to position the selected probe 19 above inlet port 32 of the designated cover member 24. This also positions probe selector 49 between the pair of probe collars 47 and 48 on the probe 10. Once positioned, z axis actuator 26 (e.g. in the form of a driven lead screw), moves the probe down by engaging the probe selector 49 with the probe collar 47, and moves the probe up by engaging the probe selector 49 with the probe collar 48.

It will be appreciated that the probe selector may be provided in any shape or configuration that facilitates engagement of the probe collar. Additional probe collars may be provided, such as to probe collars positioned adjacent to the engagement region of the probe selector, to facilitate movement of the probe.

Figure 9:
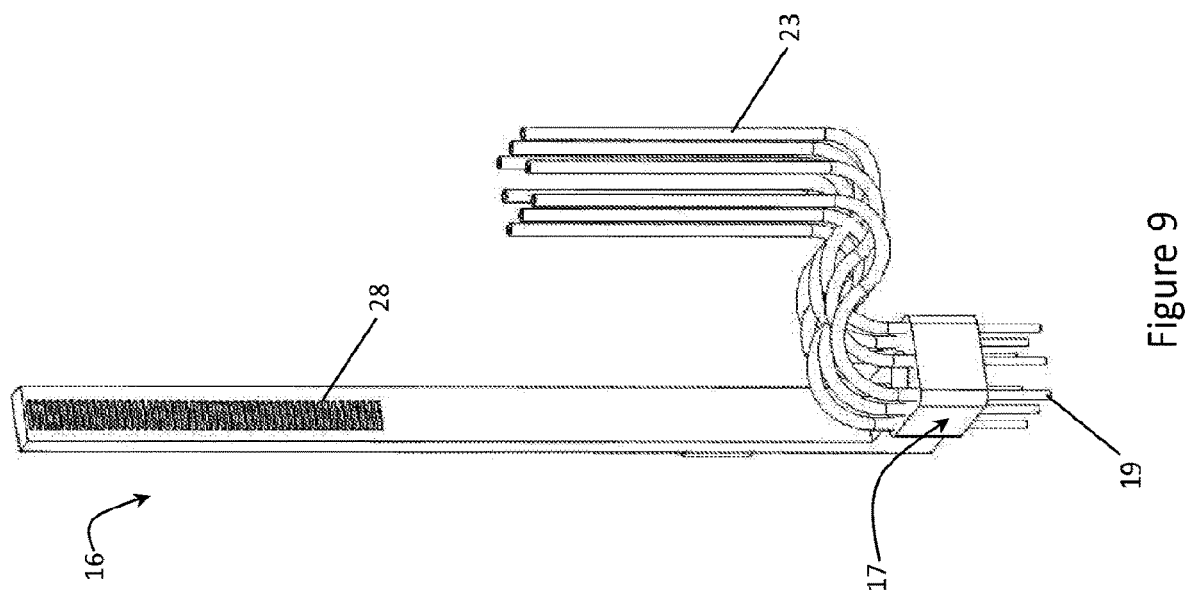
FIG. 9 is a perspective view of a fluid dispensing robot according to another embodiment of the present invention.
Figure 10:
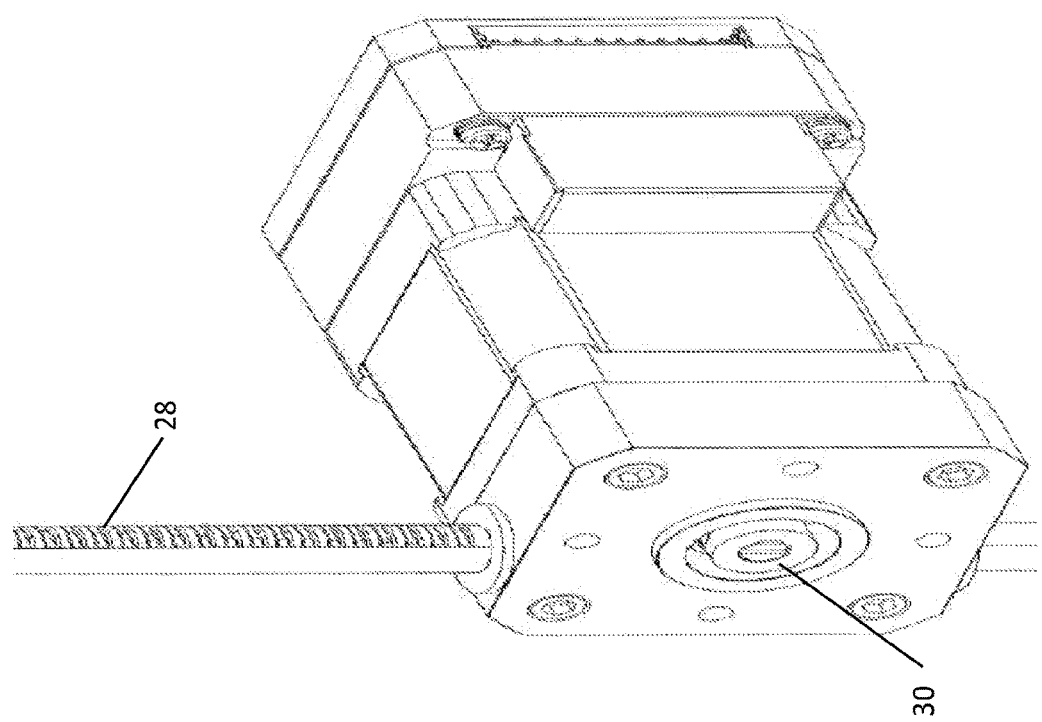
FIG. 10 is a perspective view of an actuator of a fluid dispensing robot according to an embodiment of the present invention.

In the embodiment shown in FIG. 9, the FT robot 16 is configured to move along a rack 28 in the z axis so as to locate a selected probe 19 at the designated slide treatment module 14 to dispense the selected reagent to the slide 13 received in the designated slide treatment module 14. The rack 28 is driven by a pinion 30, exemplified in one embodiment in FIG. 10, disposed on the FT robot 16 to lower and raise the probes 19 in the z axis. In this embodiment, the fluid dispensing head 17 has the probes 19 extending therefrom in the z axis in a spaced apart manner so that the non-selected probes do not interfere with the selected one of the probes when the selected probe is urged in the z axis towards the inlet port 32 of the slide treatment module 14. Here, to assist in providing clearance for each of the spaced apart probes 19 so as to avoid interference, the inlet port 32 extends from the cover member 24.

The automated slide treatment apparatus 12 also includes a wash station 35 for washing the probes 19 when inserted into a wash drum or bath thereof. In one embodiment, the probes 19 are removed manually and washed in the wash drum of the wash station 35. In another embodiment, the FT robot 16 is a gantry robot that moves in the x, y and z axes and is configured to insert each or all the probes 19 in the wash drum.

Figure 11:
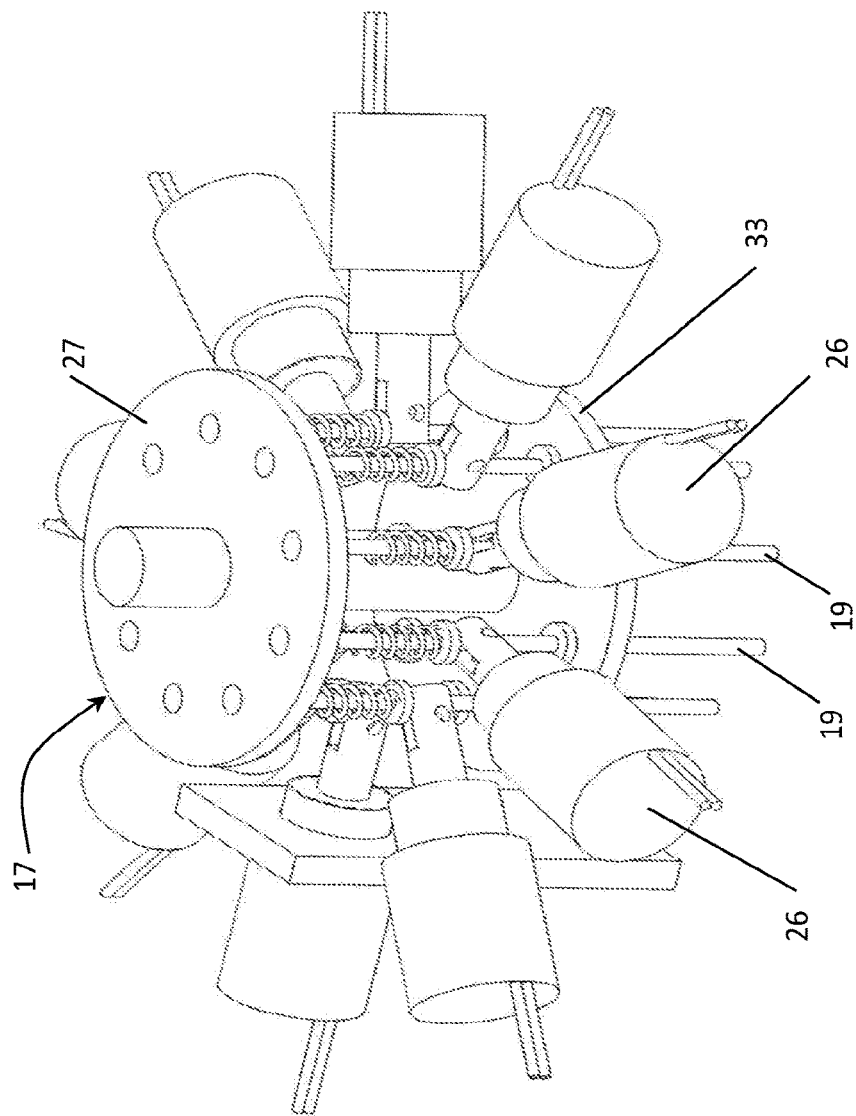
FIG. 11 is a perspective view of a plurality of z axis actuators configured to move a plurality of corresponding probes according to an embodiment of the present invention.
Figure 12:
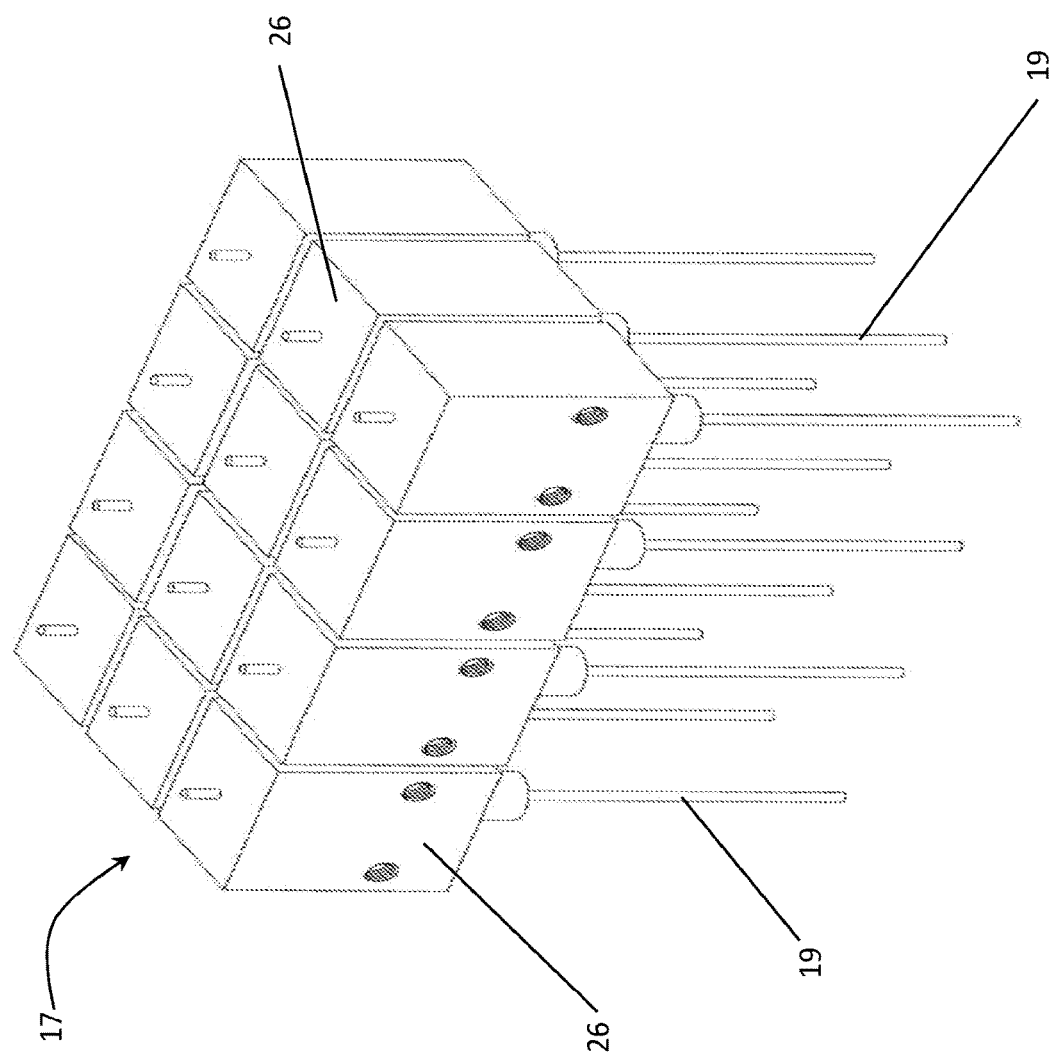
FIG. 12 is a perspective view of a fluid dispensing head also with a plurality of z axis actuators according to another embodiment of the present invention.
Figure 13:
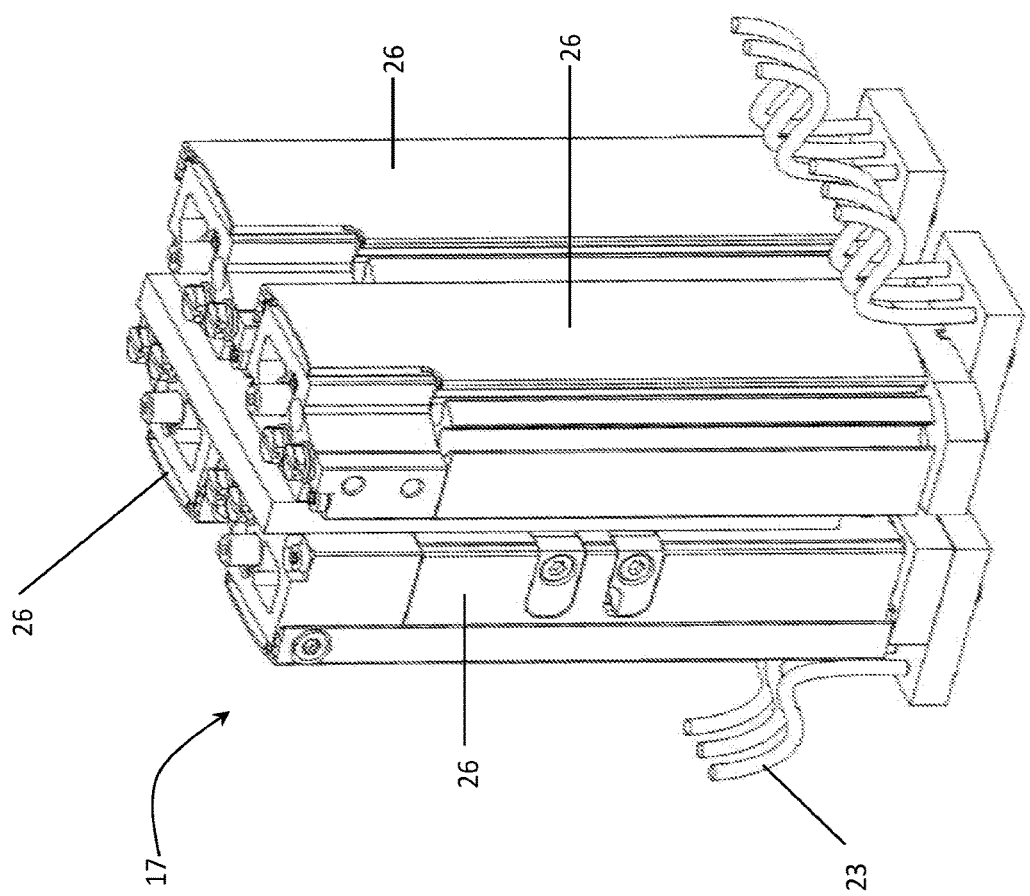
FIG. 13 is a perspective view of a fluid dispensing head according to another embodiment of the present invention.

FIGS. 11 to 13 show embodiments of the fluid dispensing head 17 having the probes 19 extending therefrom with multiple z axis actuators 26 to depress selected ones of the probes 19. FIG. 9 shows a plurality of the above described z axis actuators 26, each configured to move a dedicated one of the probes 19 in the z axis. Here, a smaller clearance is required over the cover member 24 for the non-selected probes than in, say, the embodiment of FIGS. 5 and 5*a* as the selected probe 19 can be depressed by a corresponding actuator. In addition, the movement of the probes 19 is spring loaded by springs associated with each of the probes 19 that are retained between an upper disc 27 and a lower disc 33. The lower disc 33 retains the probes 19 and is driven up for retraction of the probes 19. The top disc is optional and it can be raised to remove spring tension when retracting the probes 19 and lowered to apply spring tension prior to selecting a probe. In an example, the actuators 26 are solenoid actuators which retract to release and deselect a probe. In another example, a pull type solenoid is used with an internal return spring. This embodiment has the advantage of being able to drop all the probes 19 into the wash station 35 for simultaneous washing. FIG. 12 shows an embodiment where the plurality z axis actuators 26 are pneumatic actuators, which can include pneumatic cylinders housed within a housing. FIG. 13 shows an embodiment where there are four z axis actuators 26 disposed on the fluid dispensing head 17. Here, there are twelve probes 19 with corresponding reagent lines 23 extending therefrom. Each of the four z axis actuators 26 has three dedicated probes 19 that can be selected individually, or as a group for reagent dispensing. In this way, the clearance requirements of the non-selected ones of the probes 19 are minimised.

Figure 14:
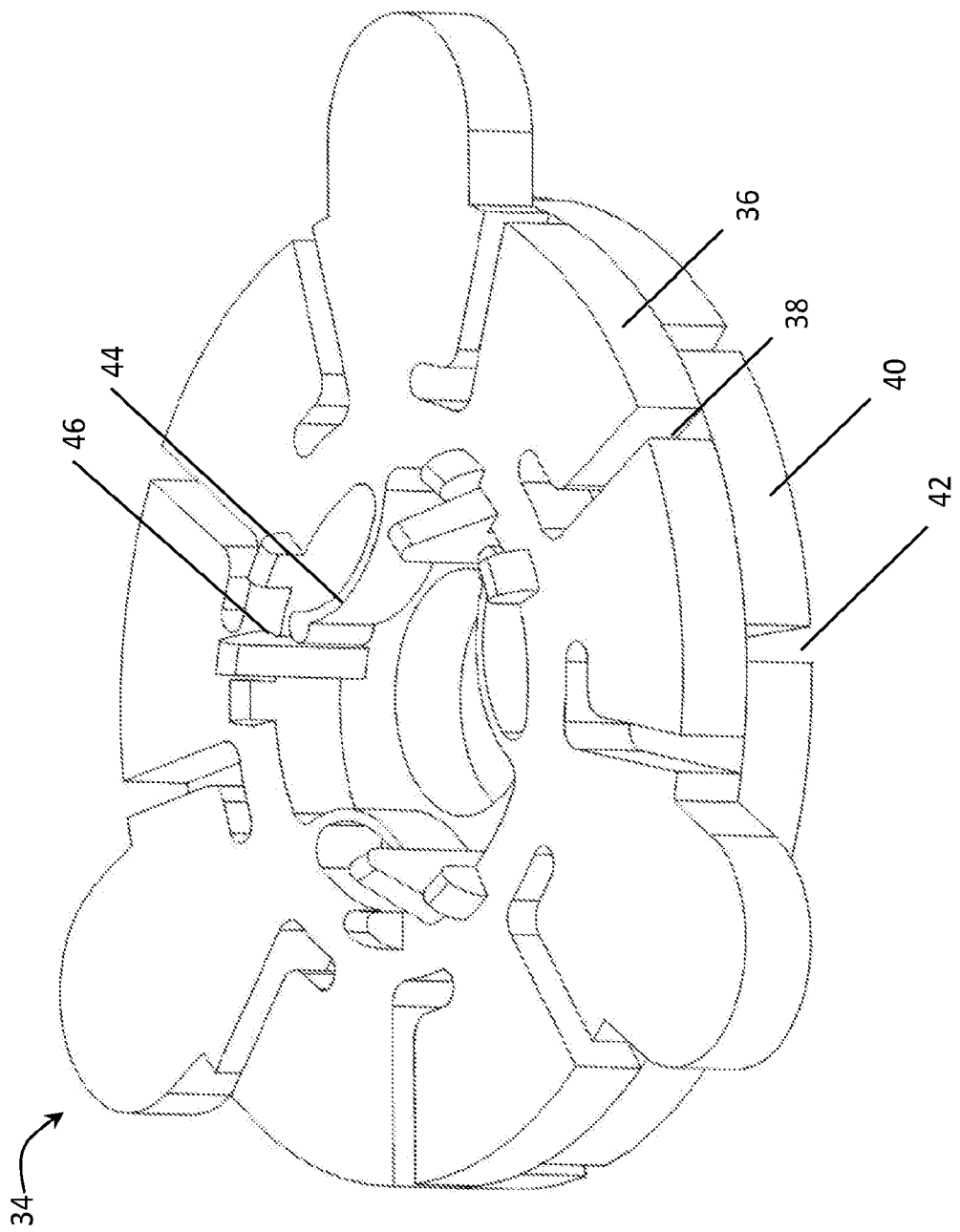
FIG. 14 is a perspective view of a probe holder of a fluid dispensing head according to an embodiment of the present invention.

The probes 19 may also be detached from the fluid dispensing head 17 to be replaced, for instance. To do so, in one embodiment, a probe holder 34 is disposed on the fluid dispensing head 17, as shown in FIG. 14. The probe holder 34 includes an upper part 36 having an upper slot 38 and a lower part 40 having a lower slot 42. FIG. 14 shows the probe holder 34 in the locked position with the probes captive. When the upper part 36 is rotated relative to the lower part 40 until the upper slot 38 and the lower slot 42 are aligned, the probes are released and can be detached from the fluid dispensing head 17. The probe holder 34 also includes a return spring 44 and clip 46 that bias the probe holder 34 to the locked position.

Referring back to FIGS. 1 and 2, the slide transport robot 18, in use, moves linearly along a rail 31 in the x direction and either of rails 29 in the y direction, depending on which has closest proximity to the target slide treatment module 14, and or which is less likely to interfere with operation of wash robots 15, as determined by the controller. Movement of the slide transport robot 18 along these tracks enables the slide transport robot 18 to move slides with a sample thereon to slide treatment modules 14. The slide transport robot 18 includes a slide transport device 20 disposed on the slide transport robot 18, which is configured by the controller to releasably hold the slides 13 so that slides can be moved in and out of the slide treatment modules 14. For example, the slide transport device 20 may be a suction cup 20 as shown in FIG. 3, arranged to releasably hold the slide 13 when it is to be moved to a slide treatment module 14 and to release the slide 13 to locate it in a slide treatment module 14. FIGS. 3 and 4 also shows a reader 50 configured to read an identifier such as a barcode or QR code on a slide 13 to track the sample being processed by the slide treatment apparatus 12. Ideally, reader 50 is angled so as to obtain an image of or emit and detect light for reading an identifier on slide 13. In some embodiments a liquid level sensor, such as an ultrasonic liquid level sensor may also be mounted on the slide transport robot 18.

Figure 15:
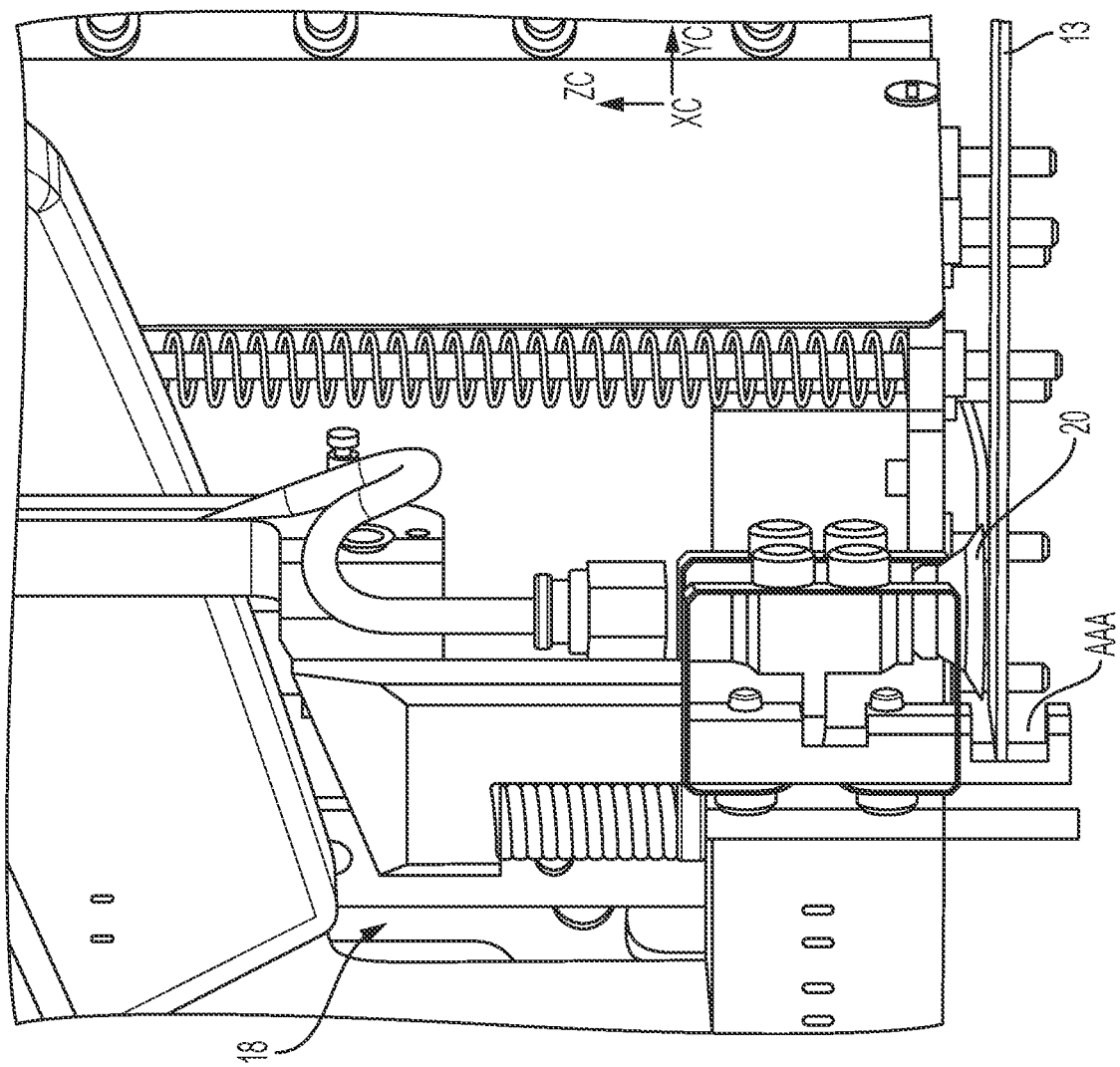
FIG. 15 is a side view of a slide transport robot according to an embodiment of the present invention.
Figure 16:
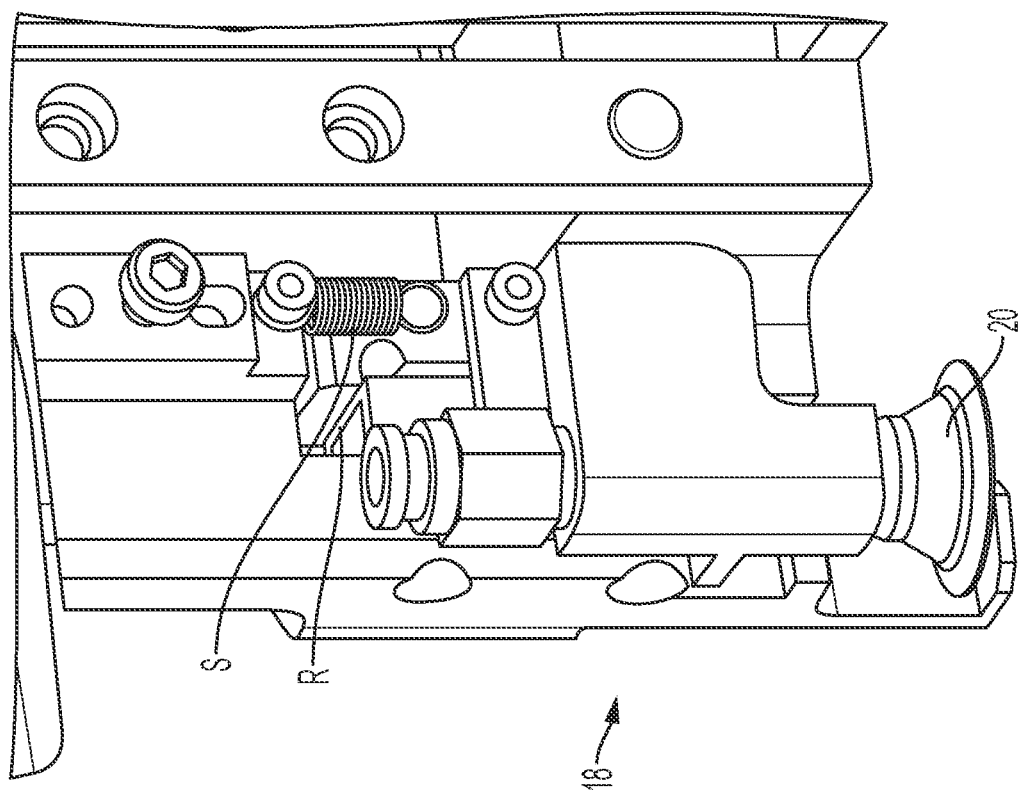
FIG. 16 is a perspective view of a slide transport robot according to an embodiment of the present invention.
Figure 17:
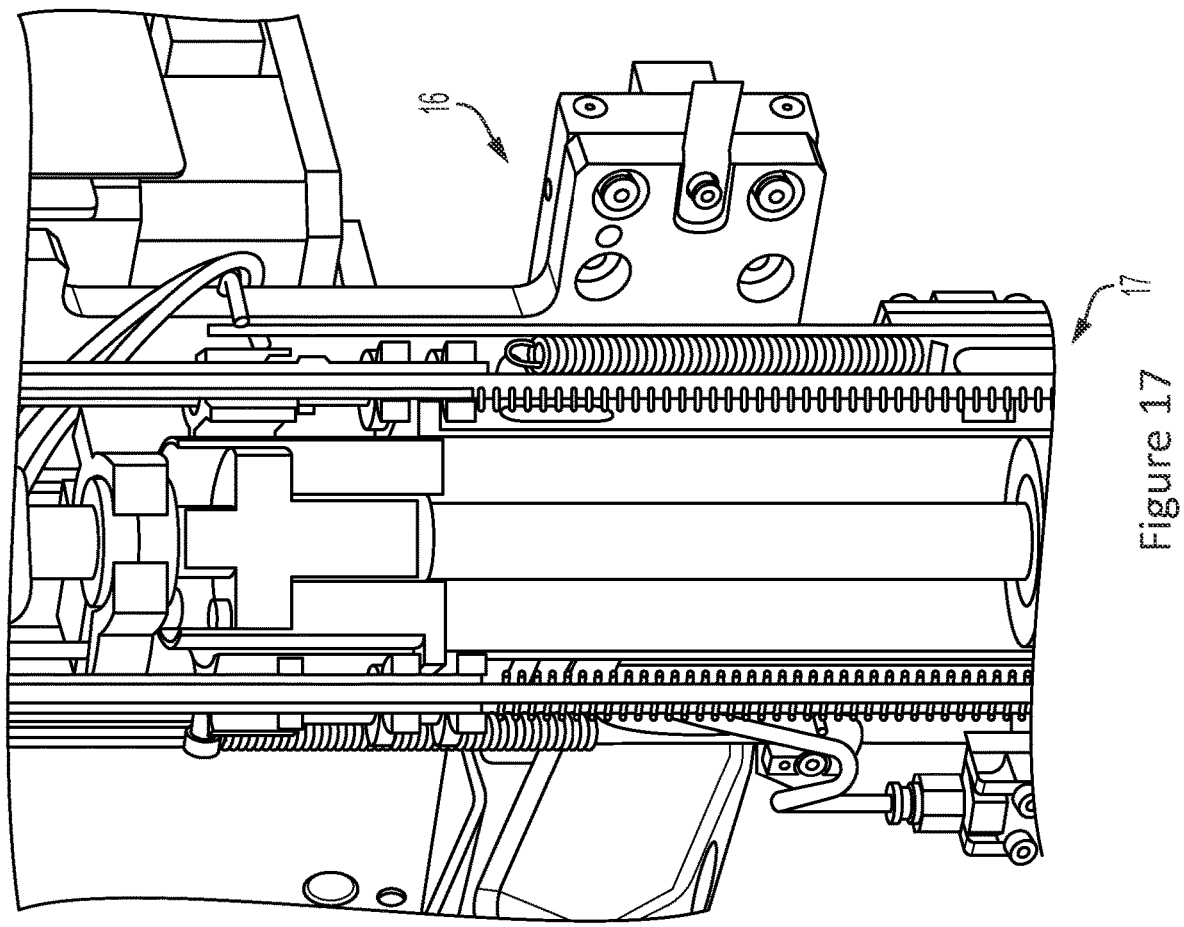
FIG. 17 is a sectional view of a fluid dispensing head of a fluid dispensing robot according to an embodiment of the present invention.

The slide transport robot 18 may also include means to facilitate disengagement of the slide after placement of the slide in the slide treatment module, or at other points where disengagement of the slide is required. Suitable means include the providing a recessed portion AAA in FIG. 15 that encompasses a portion of the slide 13 and engages the slide 13 after releasing the slide 13 at the desired location. A slide engaging portion, such as the U shaped recessed portion AAA in FIG. 15, assists the slide transport robot 18 to lift the slide 13 if it adheres to or sticks to the base of a module such as the slide treatment module 14 when the suction cup 20 engages with the slide 13 and tries to move the slide 13. In addition, the suction cup 20 is separately moveable on a rail R and has a tension arrangement S which assists with movement, as shown in FIG. 16. The tension arrangement provides a reduction in force when lifting and releasing a stuck slide when transport of the slide is required. The U shaped recess AAA will thus engage and facilitate release of the slide if adheres when transport of the slide is required. Also, the U shaped recess AAA is shaped to provide additional clearance for overhanging slide labels. FIG. 17 shows a sectional view of an embodiment of the fluid dispensing head 17 of the FT robot 16. The FT robot 16 then dispenses the selected reagent(s) to the slides 13 in the slide treatment module 14. High value reagents may be dispensed to the slides 13, in the designated slide treatment modules 14 to treat those samples disposed on the slides. Additionally/alternatively, the FT robot 16 may dispense bulk fluid reagents to the slides 13 in the designated slide treatment modules 14 for quick rinsing or washing of the sample e.g. when wash robots 15 are not available. In some embodiments dispensing of wash reagent using FT robot 16 may eliminate wash robots 15 from the slide treatment apparatus 12 which may lower the cost of production, albeit potentially at the expense of throughput.

It can be seen that the slide transport robot 18 and the FT robot 16 clear the wash robots 15 in the z axis so that they can be operated and controlled independently by the controller. It will be appreciated that the controller of the automated slide treatment apparatus 12—and the slide transport robot 18, the wash robots 15 and the FTP robot 16—can either be implemented remotely from the apparatus 12 or can be implemented locally with respect to the apparatus 12. In any case, it will also be appreciated that the controller includes a number of modules, implemented by a processor and a memory for storing instructions for the modules, to provide instructions to the slide transport robot 18 to control movement thereof and to the wash robots 15 and the FT robot 16 to control dispensing of reagents. It will be appreciated by those persons skilled in the art that the memory includes instructions to configure the controller to dispense bulk fluid reagents and high value reagents in a predetermined sequence to treat the tissue samples on the slide 13.

In an example, the tissue samples are stained according to a predetermined staining protocol for in-situ hybridization (ISH) and immunohistochemical (IHC) applications stored in the memory. In this way, the wash robots 15 and the FT robot 16 are configured by the controller to dispense reagents for each of the slide treatment modules 14 to treat (e.g. stain) tissue samples disposed on each of the slides 13 in the modules 14 independently in a predetermined order. For example, the tissue samples are first treated with bulk reagents by the FT robot 16, such as alcohol and dewaxing agent, and then treated with chromogens by the FT robot 16.

Figure 18:
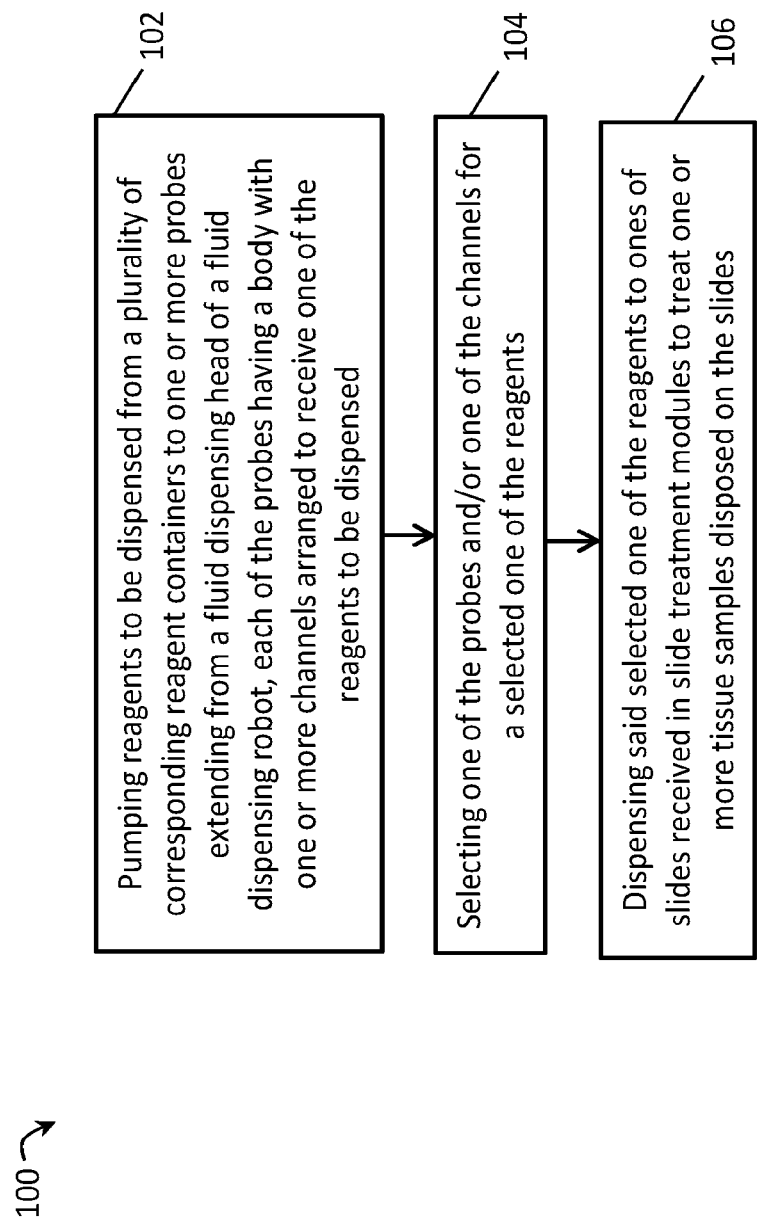
FIG. 18 is a flow chart of a method of dispensing reagents for treatment of tissue samples disposed on slides according to an embodiment of the present invention.

Referring now to FIG. 18, there is shown a summary of a method 100 of transporting fluid for treatment of one or more tissue samples disposed on slides, whereby ones of the slides are received in a plurality of slide treatment modules and a plurality of fluid reagents are dispensed by at least one fluid dispensing robot to the slides received in the slide treatment modules to treat the tissue samples on the slides. The method 100 includes a step 102 of pumping reagents to be dispensed from a plurality of corresponding reagent containers to one or more probes extending from a fluid dispensing head of a fluid dispensing robot, each of the probes having a body with one or more channels arranged to receive one of the reagents to be dispensed, a step 104 of selecting one of the probes and/or one of the channels for a selected one of the reagents, and a step 106 of dispensing the selected one of the reagents to ones of slides received in slide treatment modules to treat one or more tissue samples disposed on the slides.

Further aspects of the method will be apparent from the above description of the fluid transport system 10. A person skilled in the art will also appreciate that a method could be embodied in a program code. The program code could be supplied in a number of ways, for example on a tangible computer readable medium, such as a disc or a memory.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The discussion of documents, acts, materials, devices, articles and the like is included in this specification solely for the purpose of providing a text for the present invention. It is not suggested or represented that any of these matters formed part of the prior art base or were common general knowledge in the field relevant to the present invention as it existed before the priority date of each claim of this application.

Where the terms "comprise, "includes", "comprised" or "comprising" are used in this specification (including the claims) they are to be interpreted as specifying the presence of one or more features, but not precluding the presence or addition of further features in various embodiments of the invention.

The invention claimed is:

1. A fluid transport system for an automated slide treatment apparatus for treating one or more tissue samples disposed on slides, the apparatus including a plurality of slide treatment modules arranged to receive ones of the slides, the fluid transport system including:
   a fluid dispensing robot configured by a controller to dispense a plurality of reagents to said ones of the slides received in the slide treatment modules to treat said one or more tissue samples respectively, wherein
   the fluid dispensing robot includes:
   a fluid dispensing head having a plurality of probes extending therefrom, each of the probes having a body with one or more channels arranged to receive one of the reagents to be dispensed, wherein each of the reagents to be dispensed are pumped from a plurality of corresponding reagent containers via a pumping means configured by the controller, wherein
   the fluid dispensing robot is configured to select one of the probes and/or one of the channels for a selected one of the reagents and to dispense said selected one of the reagents to said ones of the slides received in the slide treatment modules, and wherein the fluid dispensing robot is configured to move at least one of the slide treatment modules between open and closed configurations;
   wherein the fluid dispensing robot is configured by the controller to move the fluid dispensing head having the one or more probes in x, y and z axes with a driving means to locate said selected one of the probes in a position relative to said ones of the slides received in the slide treatment modules to dispense said selected one of the reagents.

2. The system as claimed in claim 1, wherein the driving means includes an x axis driver configured by the controller to move the fluid dispensing head in the x axis, a y axis driver configured by the controller to move the fluid dispensing head in the y axis, and a z axis driver configured by the controller to move the fluid dispensing head in the z axis.

3. The system as claimed in claim 2, wherein the driving means includes a θ axis driver configured by the controller to move the fluid dispensing head around the θ axis.

4. The system as claimed in claim 1, wherein the fluid dispensing robot is configured by the controller to rotably move the fluid dispensing head around a θ axis with the driving means.

5. The system as claimed in claim 4, wherein the fluid dispensing head includes a barrel having each of the probes spaced substantially about a periphery of the barrel and arranged to be rotated around the θ axis.

6. The system as claimed in claim 1, wherein the dispensing head includes a plurality of z axis actuators each configured by the controller to independently move a corresponding one of the probes in the z axis.

7. The system as claimed in claim 1, wherein each of the probes include a nozzle disposed at a distal end of the probes to dispense said one of the reagents.

8. The system as claimed in claim 7, wherein the nozzle of each of the probes is arranged to couple with a cover member in said one of the slide treatment modules and substantially sealingly mate with an inlet port of said cover member whilst said one if the reagents is being dispensed.

9. The system as claimed in in claim 8, wherein the fluid dispensing robot is configured to urge the nozzle of the probe in the z axis towards the inlet port of said one of the slide treatment modules with the driving means whilst said one of the reagents is being dispensed to maintain the seal with the inlet port.

10. The system as claimed in claim 1, wherein the pumping means includes a plurality of pumps, each of said pumps associated with each one of the plurality of reagents for pumping said ones of the reagents to each one of the channels and/or each one of the probes via a plurality of corresponding reagent lines.

11. The system as claimed in claim 1, wherein the fluid transport system further includes a wash station for washing the one or more probes when inserted in a wash drum thereof.

12. The system as claimed in claim 1, wherein the fluid dispensing robot includes a high value fluid transfer probe configured by the controller to dispense the plurality of reagents to said ones of the slides received in the slide treatment modules.

13. The system as claimed in claim 1, wherein the fluid dispensing head further has a treatment module actuator configured to move the at least one of the slide treatment modules between the open and closed configurations.

14. The system as claimed in claim 13, wherein the treatment module actuator is permanently positioned on the fluid dispensing head or is retractable with respect to the fluid dispensing head.

15. The system as claimed in claim 14, wherein the treatment module actuator is a u-shaped member operable to engage an opening mechanism on the at least one of the slide treatment modules causing it to pivot to the open configuration.

16. The system as claimed in claim 14, wherein the treatment module actuator is a finger operable to engage an opening mechanism on the at least one of the slide treatment modules causing the opening mechanism to open or close the at least on of the slide treatment modules.

17. The system as claimed in claim 13, wherein the treatment module actuator is configured to move the at least one of the slide treatment modules between the open and closed configurations:
   by, from the closed configured to the open configuration, actively moving the at least one of the slide treatment modules from the closed configuration to the open configuration, and
   by, from the open configuration to the closed configuration, passively allowing the at least one of the slide treatment modules to move from the open configuration to the closed configuration by at least a biasing of the at least one of the slide treatment modules.

18. The system as claimed in claim 1, wherein the fluid dispensing robot is further configured to move the slide treatment modules individually between the open and closed configurations such that the at least one of the slide treatment modules is in the open configuration while at least another one of the slide treatment modules is in the closed configuration.

19. The system as claimed in claim 1, wherein the fluid dispensing head includes a barrel having each of the probes spaced substantially about a periphery of the barrel and arranged to be rotated around a $\theta$ axis of the fluid dispensing head.

* * * * *